US012507927B2

(12) United States Patent
Takei

(10) Patent No.: US 12,507,927 B2
(45) Date of Patent: Dec. 30, 2025

(54) BRAIN FUNCTION EVALUATION DEVICE, BRAIN FUNCTION EVALUATION METHOD AND BRAIN FUNCTION EVALUATION PROGRAM

(71) Applicant: JVCKENWOOD Corporation, Yokohama (JP)

(72) Inventor: Hiroyuki Takei, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 435 days.

(21) Appl. No.: 18/175,571

(22) Filed: Feb. 28, 2023

(65) Prior Publication Data

US 2023/0200695 A1 Jun. 29, 2023

Related U.S. Application Data

(63) Continuation of application No. PCT/JP2021/021441, filed on Jun. 4, 2021.

(30) Foreign Application Priority Data

Sep. 15, 2020 (JP) .................................. 2020-154968
Sep. 15, 2020 (JP) .................................. 2020-154969

(51) Int. Cl.
*A61B 5/00* (2006.01)
*A61B 3/00* (2006.01)
(Continued)

(52) U.S. Cl.
CPC ............ *A61B 5/163* (2017.08); *A61B 3/0091* (2013.01); *A61B 3/14* (2013.01); *A61B 5/4088* (2013.01)

(58) Field of Classification Search
CPC ....................................................... A61B 5/163
See application file for complete search history.

(56) References Cited

U.S. PATENT DOCUMENTS 10,646,172 B2 * 5/2020 Delis ..................... A61B 5/162
11,241,152 B2 * 2/2022 Hakoshima ............ A61B 3/024
(Continued)

FOREIGN PATENT DOCUMENTS

JP 2011-083403 4/2011
JP 2019-171022 10/2019
(Continued)

OTHER PUBLICATIONS

International Search Report and Written Opinion for International Application No. PCT/JP2021/021441 mailed on Aug. 24, 2021, 16 pages.

*Primary Examiner* — Joseph M Santos Rodriguez
(74) *Attorney, Agent, or Firm* — Amin, Turocy & Watson, LLP

(57) ABSTRACT

An evaluation device includes an image data acquisition unit that acquires image data on eyeballs of a subject, a point-of-gaze detector that detects positional data on a point of gaze of the subject based on the image data, a display controller that causes a display unit to display a plurality of routes that connect a start point and an end point and a plurality of target subjects that are arranged along the routes, an area setting unit that sets a route area corresponding to each of the routes and a target area corresponding to each of the target subjects on the display unit, a determination unit that determines whether a point of view of the subject is present in the route area and the target area based on the positional data on the point of gaze, and an evaluation unit.

6 Claims, 14 Drawing Sheets

(51) Int. Cl.
*A61B 3/14* (2006.01)
*A61B 5/16* (2006.01)

(56) References Cited

U.S. PATENT DOCUMENTS 12,161,410 B2 * 12/2024 Blaha ................ A61B 3/0091
2018/0336796 A1  11/2018 Delis et al.

FOREIGN PATENT DOCUMENTS

| JP | 2020-025849 | 2/2020 |
| JP | 2020-103746 | 7/2020 |
| JP | 2020-123032 | 8/2020 |

* cited by examiner

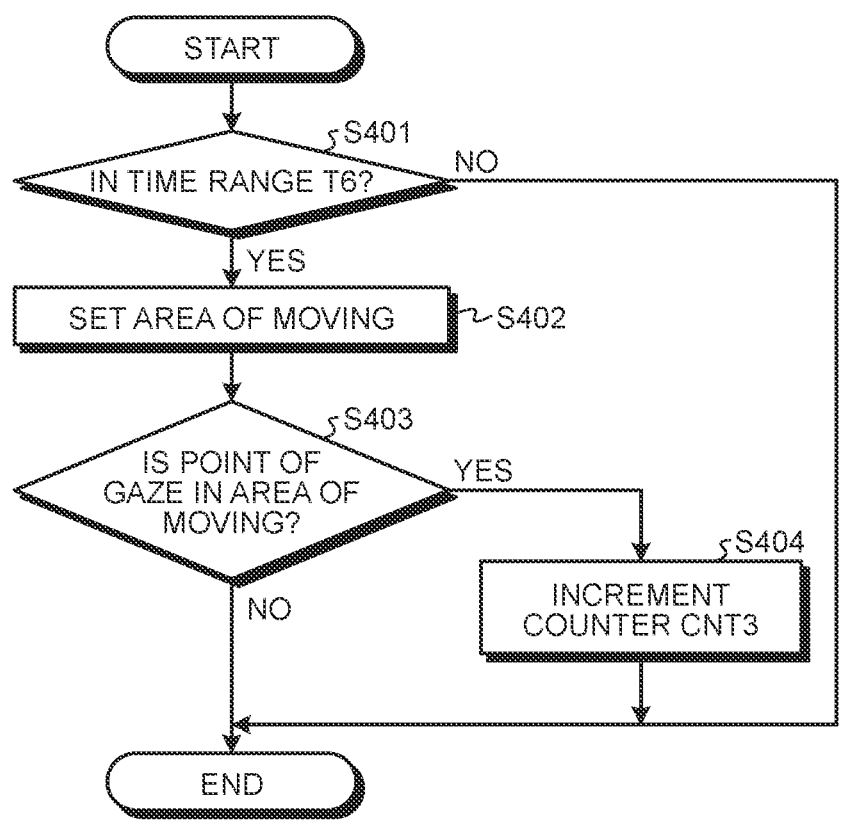

FIG.12

| ITEM CATEGORY | ROUGH CATEGORY | MEDIUM CATEGORY |
|---|---|---|
| ITEM | FRUITS | APPLE, ORANGE AND STRAWBERRY |
| | MEAT | PORK AND BEEF |
| | DELICATESSENS | FRIED FOODS AND SIMMERED FOODS |
| | VEGETABLES | JAPANESE RADISH, CARROT AND CABBAGE |
| | FROZEN FOODS | FROZEN DUMPLING |
| | SEASONINGS | SALT, PEPPER AND SUGAR |
| | FISH | SLICED RAW FISH AND DRIED JAPANESE HORSE MACKEREL |
| | DAILY PRODUCTS | YOGURT AND MILK |
| | BREAD | SANDWICH AND WHITE BREAD |
| | CONFECTIONS | CHOCOLATE, CANDY AND GUM |

BRAIN FUNCTION EVALUATION DEVICE, BRAIN FUNCTION EVALUATION METHOD AND BRAIN FUNCTION EVALUATION PROGRAM

CROSS-REFERENCE TO RELATED APPLICATION

This application is a Continuation of PCT International Application No. PCT/JP2021/021441 filed on Jun. 4, 2021 which claims the benefit of priority from Japanese Patent Applications No. 2020-154968 and No. 2020-154969, both filed on Sep. 15, 2020, the entire contents of all of which are incorporated herein by reference.

BACKGROUND

1. Technical Field

The present disclosure relates to an evaluation device, an evaluation method and an evaluation program.

2. Description of the Related Art

It is considered that cognitive disorder and brain dysfunction cases have been on the rise in recent years and finding such cognitive disorder and brain dysfunction early and quantitatively evaluating severity of symptoms are required. It is known that symptoms of cognitive disorder and brain dysfunction affect cognitive performance. For this reason, a subject is evaluated based on cognitive performance of the subject. For example, a device that displays a plurality of types of numbers, that causes a subject to sum the numbers to calculate an answer, and that checks the answer provided by the subject has been provided (refer to Japanese Laid-open Patent Publication No. 2011-083403).

The method according to Japanese Laid-open Patent Publication No. 2011-083403, etc., is of a mode in which a subject chooses an answer by an operation on a touch panel, or the like, and it is difficult to obtain high accuracy of evaluation because of a fortuitous right answer or an operational error made by the subject. For this reason, it had been required to evaluate cognitive disorder and brain dysfunction accurately.

SUMMARY OF THE INVENTION

It is an object of the present invention to at least partially solve the problems in the conventional technology.

An evaluation device according to an embodiment of the present disclosure includes an image data acquisition unit that acquires image data on eyeballs of a subject, a point-of-gaze detector that detects positional data on a point of gaze of the subject based on the image data, a display controller that causes a display unit to display a plurality of routes that connect a start point and an end point and a plurality of target subjects that are arranged along the routes, an area setting unit that sets a route area corresponding to each of the routes and a target area corresponding to each of the target subjects on the display unit, a determination unit that determines whether a point of view of the subject is present in the route area and the target area based on the positional data on the point of gaze, and an evaluation unit that calculates evaluation data on the subject based on a result of determination by the determination unit. The evaluation unit calculates the evaluation data having a higher value as a value of the presence time data in a question period is high, and the higher value when an order of shifts of the point of gaze of the subject in an answer period is a right answer comparing to when not a right answer, using at least a presence time data on the point of gaze of the subject in the route area and the target area in the question period during which a task to the subject and a route map are displayed by the display controller and a data on whether the order of shifts of the point of gaze of the subject in the area of moving is the right answer in the answer period after an instruction to shift the point of gaze along a matching route that passes through a specific subject that is a specific target subject among the target subjects that are arranged along the routes on the route map is made to the subject.

An evaluation method according to an embodiment of the present disclosure includes acquiring image data on eyeballs of a subject, detecting positional data on a point of gaze of the subject based on the image data, causing a display unit to display a plurality of routes that connect a start point and an end point and a plurality of target subjects that are arranged along the routes, setting a route area corresponding to each of routes and a target area corresponding to each of the target subjects on the display unit, determining whether a point of view of the subject is present in the route area and the target area based on the positional data on the point of gaze, and calculating evaluation data on the subject based on a result of the determining. When the evaluation data on the subject is calculated, the evaluation value has a higher value as a value of the presence time data in a question period is high, and the higher value when an order of shifts of the point of gaze of the subject in an answer period is a right answer comparing to when not a right answer, using at least a presence time data on the point of gaze of the subject in the route area and the target area in the question period during which a task to the subject and a route map are displayed by the display controller and a data on whether the order of shifts of the point of gaze of the subject in the area of moving is the right answer in the answer period after an instruction to shift the point of gaze along a matching route that passes through a specific subject that is a specific target subject among the target subjects that are arranged along the routes on the route map is made to the subject.

A non-transitory computer readable recording medium storing therein an evaluation program according to an embodiment that causes a computer to execute a process is disclosed. The process includes acquiring image data on eyeballs of a subject, detecting positional data on a point of gaze of the subject based on the image data, causing a display unit to display a plurality of routes that connect a start point and an end point and a plurality of target subjects that are arranged along the routes, setting a route area corresponding to each of routes and a target area corresponding to each of the target subjects on the display unit, determining whether a point of view of the subject is present in the route area and the target area based on the positional data on the point of gaze, and calculating evaluation data on the subject based on a result of the determining. When the evaluation data on the subject is calculated, the evaluation value has a higher value as a value of the presence time data in a question period is high, and the higher value when an order of shifts of the point of gaze of the subject in an answer period is a right answer comparing to when not a right answer, using at least a presence time data on the point of gaze of the subject in the route area and the target area in the question period during which a task to the subject and a route map are displayed by the display controller and a data on whether the order of shifts of the point of gaze of the subject in the area of moving is the right answer in the answer period after an instruction to shift the point of gaze along a matching route that passes through a specific subject that is a specific target subject among the target subjects that are arranged along the routes on the route map is made to the subject.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a flowchart illustrating an example of a right answer process according to the first embodiment;

FIG. 12 is a diagram illustrating an example of categories of things;

DETAILED DESCRIPTION OF THE PREFERRED EMBODIMENTS

An embodiment of an evaluation device, an evaluation method, and an evaluation program according to the disclosure will be described below based on the accompanying drawings. The embodiment does not limit the disclosure. The components in the embodiment described below include ones that are replaceable by those skilled in the art and easy or ones that are substantially the same.

In the following description, a three-dimensional global coordinate system is set and description on a positional relationship among components will be given. A direction parallel to a first axis on a given plane is set for a X-axis direction, a direction parallel to a second axis on a given plane orthogonal to the first axis is set for a Y-axis direction, and a direction parallel to a third axis orthogonal to each of the first axis and the second axis is set for a Z-axis direction. The given planes include an X-Y plane.

First Embodiment

Evaluation Device

Figure 1:
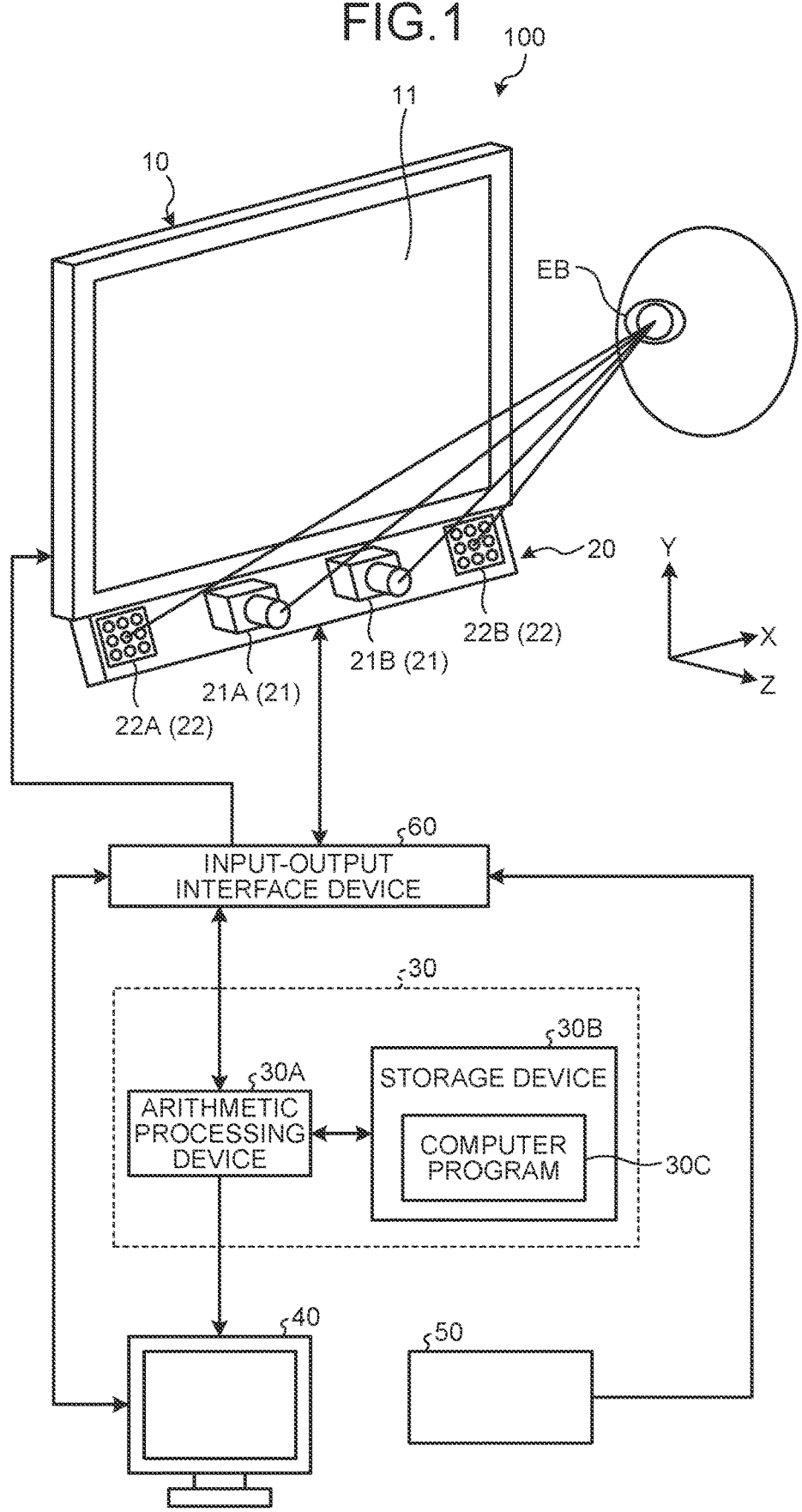
FIG. 1 is a diagram schematically illustrating an example of an evaluation device according to a first embodiment.

FIG. 1 is a diagram schematically illustrating an example of an evaluation device 100 according to a first embodiment. The evaluation device 100 according to the first embodiment detects lines of sight of a subject and makes an evaluation on cognitive disorder and brain dysfunction by using the result of the detection. The evaluation device 100 is able to detect a line of sight of a subject using various types of methods, such as a method of detecting a line of sight based on a position of a pupil of a subject and a position of a cornea reflection image or a method of detecting a line of sight based on a position of an inner corner of an eye of a subject and a position of an iris.

As illustrated in FIG. 1, the evaluation device 100 includes a display device 10, an image acquisition device 20, a computer system 30, an output device 40, an input device 50, and an input-output interface device 60. The display device 10, the image acquisition device 20, the computer system 30, the output device 40, and the input device 50 perform data communications via the input-output interface device 60. Each of the display device 10 and the image acquisition device 20 includes a drive circuit not illustrated in the drawing.

The display device 10 includes a flat panel display, such as a liquid crystal display (LCD) or an organic electroluminescence display (OLED). In the first embodiment, the display device 10 includes a display unit 11. The display unit 11 displays information, such as an image. The display unit 11 is substantially parallel to the X-Y plane. The X-axis direction is left and right directions with respect to the display unit 11, the Y-axis direction is an up and down directions with respect to the display unit 11, and the Z-axis direction is a depth direction orthogonal to the display unit 11. The display device 10 may be a head mounted display device. In the case where the display device 10 is a head-mounted display device, such a configuration as that of the image acquisition device 20 is arranged in a head mounted module.

The image acquisition device 20 acquires image data on left and right eye balls EB of the subject and transmits the acquired image data to the computer system 30. The image acquisition device 20 includes an imaging device 21. The imaging device 21 acquires image data by capturing images of the left and right eye balls EB of the subject. The imaging device 21 includes various cameras corresponding to the method of detecting a line of sight of the subject. For example, in the case of the method of detecting a line of sight based on a position of a pupil of a subject and a position of a cornea reflection image, the imaging device 21 includes an infrared camera and includes an optical system that is able to transmit near-infrared light of, for example, a wavelength of 850 nanometers (nm) and an imaging device that is able to receive the near infrared light. In the case of the method of detecting a line of sight based on a position of an inner corner of an eye of a subject and a position of an iris, the imaging device 21 includes a visible light camera. The imaging device 21 outputs a frame synchronization signal. The period of the frame synchronization signal can be set at, for example, 20 milliseconds (msec); however, the period is not limited to this; however, the period is not limited to this. The imaging device 21 can have, for example, a configuration of a stereo camera including a first camera 21A and a second camera 21B; however, the configuration is not limited to this.

For example, in the case of the method of detecting a line of sight based on a position of a pupil of a subject and a position of a cornea reflection image, the image acquisition device 20 includes an illuminating device 22 that illuminates the eyeballs EB of the subject. The illuminating device 22 includes a light emitting diode (LED) light source and is capable of emitting near-infrared light of, for example, a wavelength of 850 nanometers. Note that, for example, in the case of a method of detecting a line-of-sight vector based on a position of an inner corner of an eye of a subject and a position of an iris, the illuminating device 22 need not be provided. The illuminating device 22 emits detection light in synchronization with a frame synchronization signal of the imaging device 21. The illuminating device 22 can be configured to include, for example, a first light source 22A and a second light source 22B; however, the configuration is not limited to this.

The computer system 30 has general control on operations of the evaluation device 100. The computer system 30 includes an arithmetic processing device 30A and a storage device 30B. The arithmetic processing device 30A includes a microprocessor, such as a CPU (central processing unit). The storage device 30B includes memories, such as a ROM (read only memory) and a RAM (random access memory), or a storage. The arithmetic processing device 30A performs arithmetic processing according to a computer program 30C that is stored in the storage device 30B.

The output device 40 includes a display device, such as a flat panel display. Note that the output device 40 may include an audio output device and a printing device. The input device 50 is operated and thereby generates input data. The input device 50 includes a keyboard or a mouse for computer systems. Note that the input device 50 may include a touch sensor with which the display unit of the output device 40 serving as a display device is provided.

The evaluation device 100 according to the embodiment is a device in which the display device 10 and the computer system 30 are independent of each other. Note that the display device 10 and the computer system 30 may be integrated. For example, the evaluation device 100 may include a tablet personal computer. In this case, a display device, an image acquisition device, a computer system, an input device, an output device, etc., may be installed in the tablet personal computer.

Figure 2:
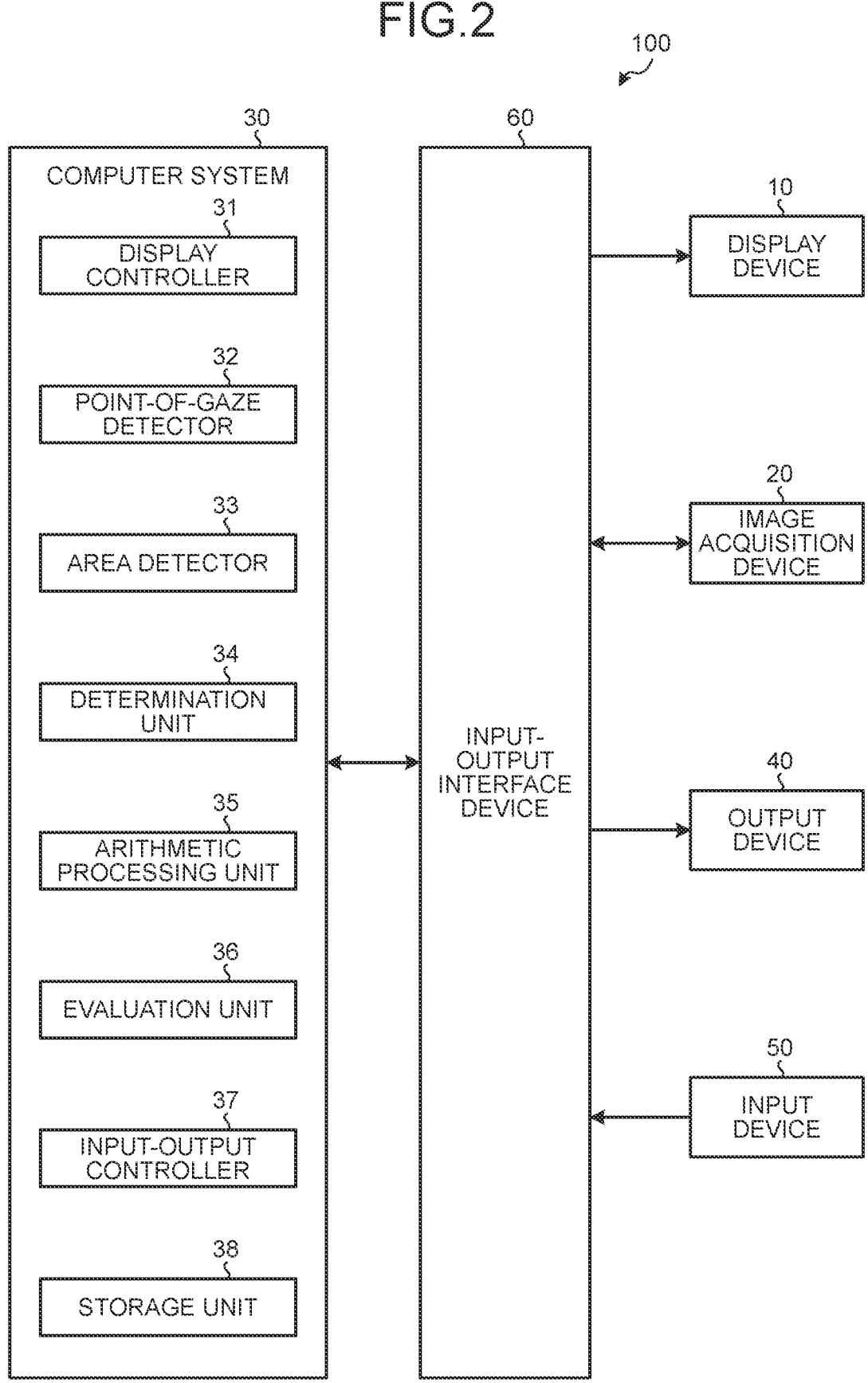
FIG. 2 is a functional block diagram illustrating the example of the evaluation device according to the first embodiment.

FIG. 2 is a functional block diagram illustrating an example of the evaluation device 100. As illustrated in FIG. 2, the computer system 30 includes a display controller 31, a point-of-gaze detector 32, an area setting unit 33, a determination unit 34, an arithmetic processing unit 35, an evaluation unit 36, an input-output controller 37, and a storage unit 38. Functions of the computer system 30 are implemented by the arithmetic processing device 30A and the storage device 30B (refer to FIG. 1). Part of the functions of the computer system 30 may be provided outside the evaluation device 100.

The display controller 31 causes the display unit 11 to display a route map containing a plurality of routes that connect a start point and an end point. For example, when an instruction to shift the point of gaze along a matching route that meets a given condition from a plurality of routes that are illustrated in the route map displayed on the display unit 11 is made to the subject, the display controller 31 causes the display unit 11 to display the route map according to the instruction.

The display controller 31 may cause the display unit 11 to display a route map on which a plurality of target subjects are arranged along a plurality of routes. When an instruction to shift the point of gaze along a matching route that passes through a specific subject that is a specific target subject among the target subjects that are arranged along the routes on the route map is made to the subject, the display controller 31 causes display of the route map containing the target subjects according to the instruction.

The display controller 31 is able to cause the display unit 11 to display instruction information representing each instruction to the above-described subject. In this case, after causing the display unit 11 to display the instruction information for a given period, the display controller 31 is able to cause the display unit 11 to display the route map. Note that the instruction information to the above-described subject is not limited to the mode of being displayed on the display unit 11. For example, the instruction may be made to the subject previously, a mode in which the instruction is made to the subject by sound may be employed, or a mode in which the instruction is presented in a site different from the display unit 11 may be employed.

After causing the display unit 11 to display the route map, the display controller 31 is able to display right answer information representing a right answer to the instruction on the display unit 11. The display controller 31 is able to cause the display unit 11 to display, as right information, how a moving subject moves from the start point to the end point along a right route.

The point-of-gaze detector 32 detects positional data on the point of gaze of the subject. In the first embodiment, the point-of-gaze detector 32 detects a line-of-sight vector of the subject that is specified by the three-dimensional global coordinate system based on the image data on the left and right eyeballs EB of the subject that is acquired by the image acquisition device 20. The point-of-gaze detector 32 detects positional data on an intersection between the detected line-of-sight vector of the subject and the display unit 11 of the display device 10 as positional data on the point of gaze of the subject. In other words, in the first embodiment, the positional data on the point of gaze is the positional data of the intersection between the line-of-sight vector of the subject that is specified by the three-dimensional global coordinate system and the display unit 11 of the display device 10. In the first embodiment, the point of gaze is a specified point on the display unit 11 that is specified by being gazed by the subject. The point-of-gaze detector 32 detects positional data on the point of gaze of the subject at specified sampling intervals. The sampling interval can be, for example, the period of the frame synchronization signal that is output from the imaging device 21 (for example, every 20 milliseconds).

The area setting unit 33 sets a route area corresponding to the matching route on the display unit 11. The area setting unit 33 is able to further set a target area corresponding to the specific subject and an area of moving corresponding to the moving subject on the display unit 11. The route area, the target area and the area of moving are sometimes collectively referred to as "determination areas" below. In the first embodiment, the determination areas that are set by the area setting unit 33 are not displayed on the display unit 11 in principle. Note that the determination areas may be displayed on the display unit 11 under the control of the display controller 31.

During the period in which the determination areas are set by the area setting unit 33, the determination unit 34 determines whether the point of gaze is present in each of the determination areas based on the positional data on the point of gaze and outputs determination data. The determination unit 34 determines whether the point of gaze is present in the determination areas at specified determination intervals. The determination interval can be, for example, the same period as the period of the frame synchronization signal that is output from the imaging device 21 (for example, every 20 milliseconds). In this case, the determination interval of the determination unit 34 is the same as the sampling interval of the point-of-gaze detector 32.

Based on the determination data obtained by the determination unit 34, the arithmetic processing unit 35 calculates point-of-gaze data representing the progress of shift of the point of gaze in the period in which the above-described determination areas are set. The arithmetic processing unit 35 calculates, for example, presence time data, number-of-shifts data, target reaching data, last area data, and shift order data as the point of gaze data.

The presence time data is data representing a time in which the point of gaze is present in the determination areas. The number-of-shifts data is data representing, in the case where a plurality of route areas are set and a right answer is present in the number of shifts through a plurality of route areas, a difference between the number of shifts serving as the right answer and an actual number of shifts. The goal reaching data is data representing, in the case where a target subject is set, whether the point of gaze reaches the target subject along a route. End point reaching data is data representing, in the case where a right answer is present in the order of shifts through the route areas, whether the point of gaze of the subject serving as a right answer eventually reaches a route area serving as the end point. The shift order data is data representing, in the case where a plurality of route areas are set and a right answer is in the order of shifts through the route areas, a degree of coincidence between the order of shifts serving as the right answer and an actual order of shifts.

The arithmetic processing unit 35 includes a timer that detects an elapsed time from the time when the evaluation video is displayed on the display unit 11 and a counter that counts the number of times it is determined by the determination unit 34 that the point of gaze is present in the route areas, the target area, and the area of moving. The arithmetic processing unit 35 may include a management timer that manages the time of reproduction of the evaluation video.

The evaluation unit 36 calculates evaluation data on the subject based on the point-of-gaze data. The evaluation data contains data on evaluation on whether the subject is being able to gaze the specific subject and a comparative subject that are displayed on the display unit 11.

The input-output controller 37 acquires data (image data on the eyeballs EB, input data, or the like) from at least one of the image acquisition device 20 and the input device 50. The input-output controller 37 outputs data to at least one of the display device 10 and the output device 40. The input-output controller 37 may output a task to the subject from the output device 40, such as an audio output device.

The storage unit 38 stores the determination data, the point-of-gaze data (the presence time data, the number-of-shifts data, the goal reaching data, the last area data, and the shift order data), and the evaluation data that are described above. The storage unit 38 further stores an evaluation program that causes a computer to execute a process of acquiring image data on the eyeballs of a subject; a process of detecting positional data on the point of gaze of the subject based on the image data; a process of, in the case where an instruction to shift the point of gaze along a matching route that meets the given condition from the routes illustrated on the route map is made to the subject, causing the display unit to display the route map containing the routes; a process of setting a route area corresponding to the matching route on the display unit; a process of determining whether a point of view of the subject is present in the route area based on the positional data on the point of gaze; and a process of calculating evaluation data on the subject based on the result of the determination.

Evaluation Method

The evaluation method according to the first embodiment will be described next. The evaluation method according to the first embodiment makes an evaluation on cognitive disorder and brain dysfunction of a subject by using the evaluation device 100 described above. In the first embodiment, the route map is displayed on the display unit 11 using the evaluation video, an instruction to shift the point of gaze along the matching route that meets the given condition from the routes that are illustrated on the route map is made to the subject, and it is determined whether the subject is being able to deal with the instruction.

The symptoms of cognitive disorder and brain dysfunction are known for affecting cognitive performance, performance in shifting the point of gaze, and visual pursuit performance of the subject. In the case where the subject is not suffering from cognitive disorder or brain dysfunction, when the route map and the instruction are presented, the subject is able to accurately understand the task. The subject is also able to estimate the matching route accurately and shift the point of gaze along the estimated matching route. When a target that moves along the right route is presented, the subject is able to pursue the target visually.

On the other hand, in the case where the subject is suffering from cognitive disorder and brain dysfunction, even when the route map and the instruction are presented, the subject sometimes is unable to accurately understand the task. The subject sometimes is also unable to estimate the matching route accurately and, even if the subject is able to estimate the matching route, the subject sometimes is unable to shift the point of gaze along the estimated matching route. Even when a target that moves along the right route is presented, the subject sometimes is unable to pursue the target visually. Thus, taking, for example, the following procedure makes it possible to evaluate the subject.

Figure 3:
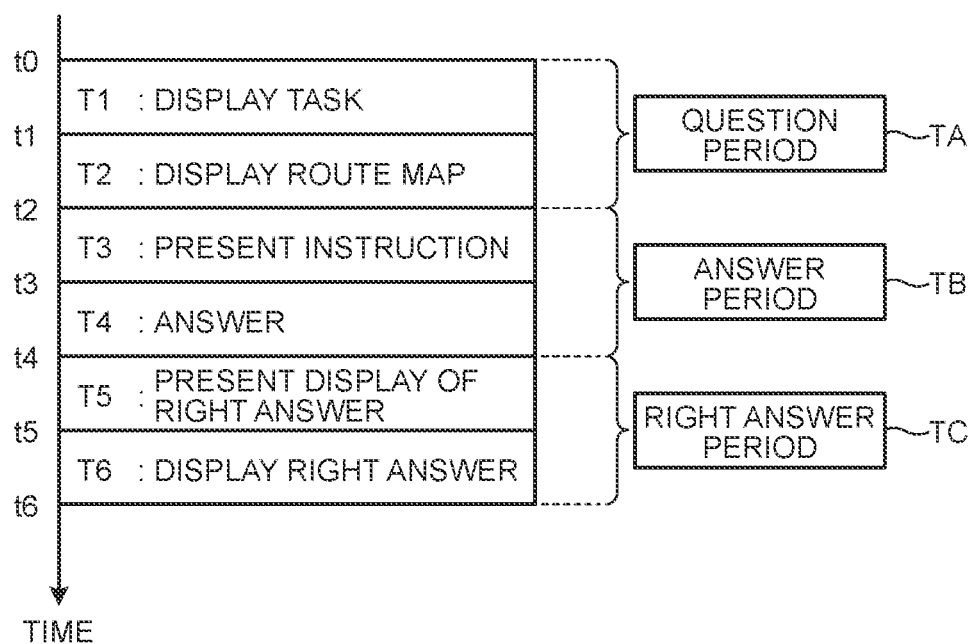
FIG. 3 is a diagram illustrating an example of a timetable of an evaluation video that is displayed on a display unit in the first embodiment.

FIG. 3 is a diagram illustrating an example of a timetable of the evaluation video that is displayed on the display unit 11. As illustrated in FIG. 3, the evaluation video has a question period TA, an answer period TB, and a right answer period TC. The question period TA includes a period T1 (from a time t0 to a time t1) during which the task to the subject is displayed on the display unit 11 and a period T2 (from a time t1 to a time t2) during which the map (route map) related to the task is displayed on the display unit 11. Note that, at and after the period T2, the map is displayed until the answer period TB ends. The answer period TB includes a period T3 (from a time t2 to a time t3) during which the instruction to the subject is output by sound and a period T4 (from a time t3 to a time t4) during which the subject is made provide an answer. During the answer period TB, the map is being displayed on the display unit 11. The right answer period TC includes a period T5 (from a time t4 to a time t5) during which an output notifying that the right answer is to be displayed is made by sound to the subject and a period T6 (from a time t5 to a time t6) during which the right answer is displayed on the display unit 11.

Figure 4:
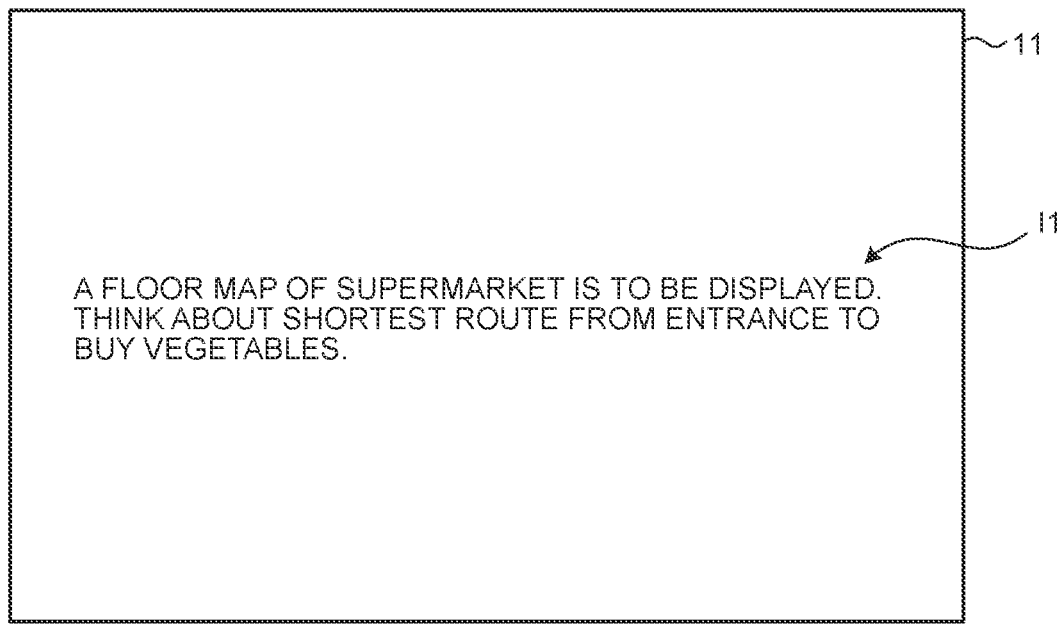
FIG. 4 is a diagram illustrating an example of an instruction that is displayed on the display unit in the first embodiment.

FIG. 4 is a diagram illustrating an example of the instruction that is displayed on the display unit 11. As illustrated in FIG. 4, in the question period TA, the display controller 31 displays, for example, instruction information I1 to the subject on the display unit 11 for a given period in the question period TA. In the first embodiment, the instruction information I1 is an instruction to consider the shortest route from the entrance to buy vegetables on a floor map of a store, such as a supermarket. Note that, in the first embodiment, the case where the instruction information I1 is displayed on the display unit 11 is exemplified; however, the instruction information I1 is not limited thereto. For example, the input-output controller 37 may make, in addition to a display of the instruction information I1 or instead of the display of the instruction information I1, an output of sound corresponding to the instruction information I1 from a speaker.

Figure 5:
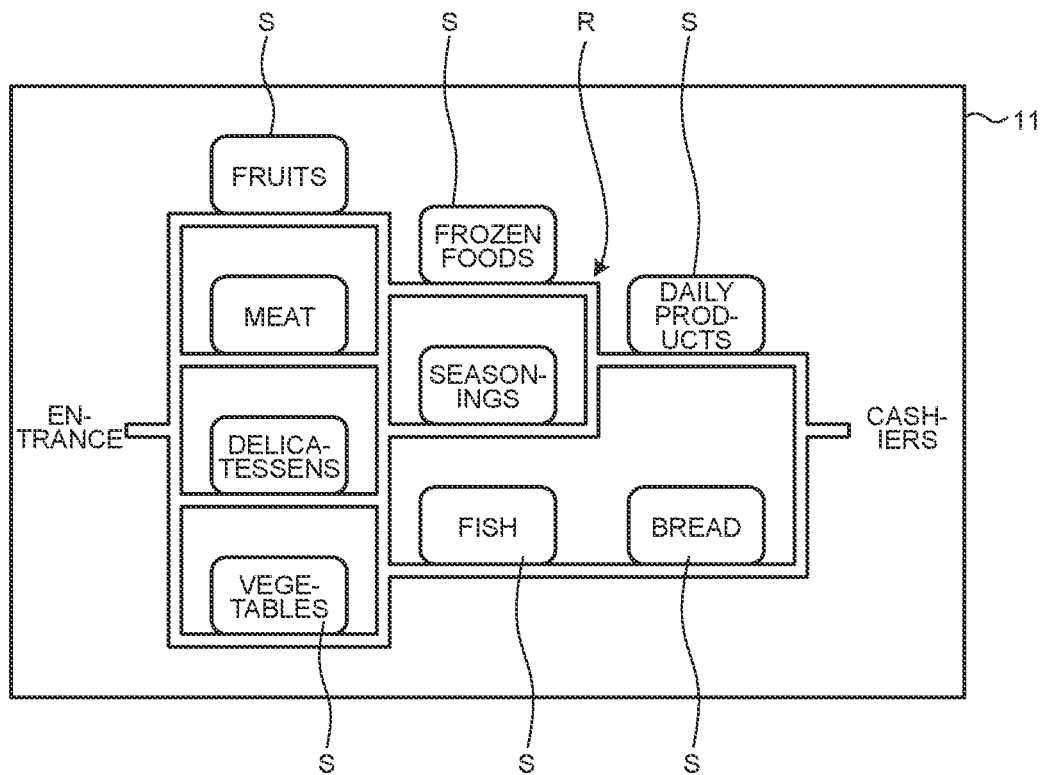
FIG. 5 is a diagram illustrating an example of a route map that is displayed on the display unit in the first embodiment.

FIG. 5 is a diagram illustrating an example of the route map that is displayed on the display unit 11. As illustrated in FIG. 5, the display controller 31 displays the floor map of the store as a route map M on the display unit 11. The route map M contains a plurality of routes R. The route map M also contains a plurality of target subjects S representing selling areas.

Figure 6:
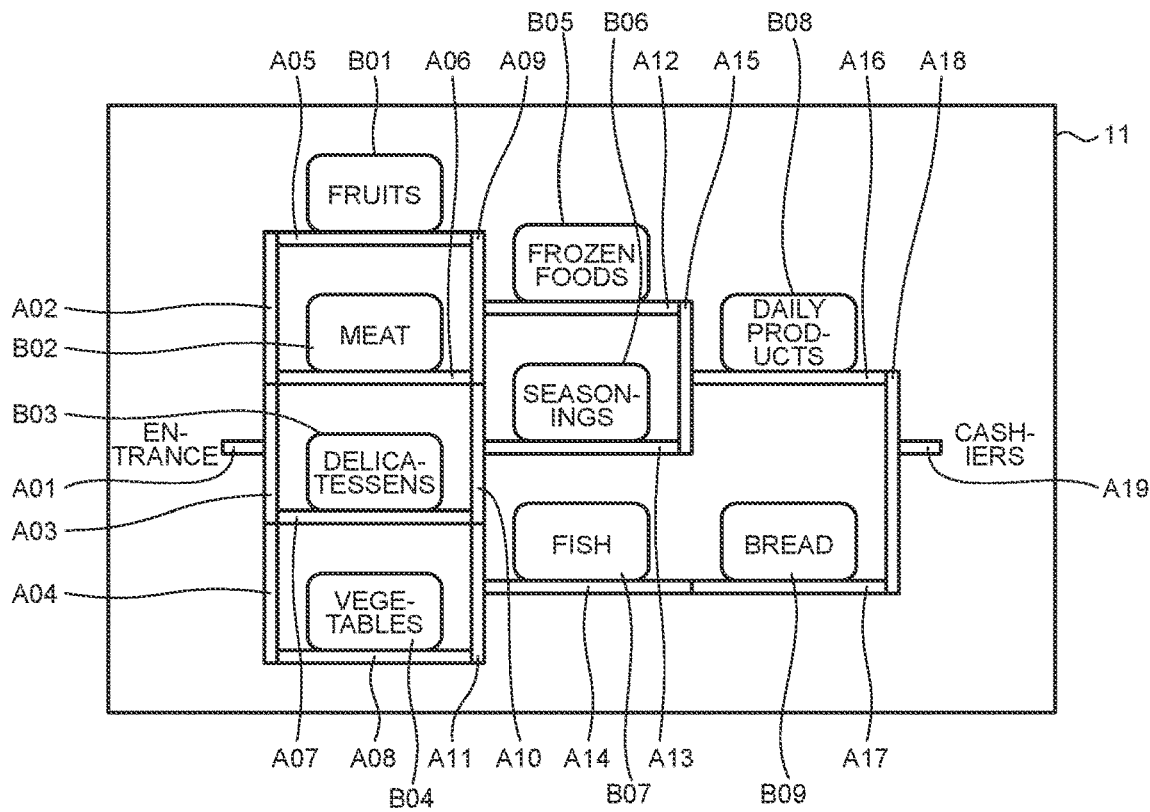
FIG. 6 is a diagram illustrating an example of determination areas that are set on the display unit in the first embodiment.

FIG. 6 is a diagram illustrating an example of the determination areas that are set on the display unit 11. FIG. 6 exemplifies and illustrates the case where the route map M is displayed on the display unit 11. As illustrated in FIG. 6, the area setting unit 33 is able to set route areas A01 to A19 corresponding to the routes R, respectively, such that the routes R are divided. The area setting unit 33 is able to set target areas B01 to B09 corresponding to the target subjects S. The area setting unit 33 is able to set the route areas A01 to A19 in rectangular areas such that the route areas A01 to A19 overlap the areas in which the routes R are presented, respectively. The area setting unit 33 is able to set the target areas B01 to B09 in areas in shapes that overlap the areas in which the target subjects S are presented, respectively. In the first embodiment, the area setting unit 33 makes a setting on the display unit 11 such that the route areas A01 to A19 do not overlap one another. The area setting unit 33 makes a setting on the display unit 11 such that the route areas A01 to A19 and the target areas B01 to B09 do not overlap each other.

When the route areas A01 to A19 for the routes R are set, the area setting unit 33 detects neighboring areas that are arranged in neighboring positions and stores information on the detected neighboring areas in the storage unit 38. In the example in FIG. 6, the area setting unit 33 detects that the route area A01 is adjacent to the route area A03. The area setting unit 33 also detects that the route area A02 is adjacent to the route areas A03, A05 and A06. The area setting unit 33 also detects that the route area A03 is adjacent to the route areas A01, A02 and A07. Similarly, the area setting unit 33 detects determination areas adjacent to each other with respect to the route areas A04 to A19 and stores the relationship that the determination areas are adjacent to each other in the storage unit 38.

The point-of-gaze detector 32 detects positional data on the point of gaze of the subject at the specified sampling intervals (for example, every 20 milliseconds) in the period during which the route map M is displayed, that is, each of the period T2 of the question period TA and the period T3 and the period T4 of the answer period TB. Based on the positional data on the point of gaze, the determination unit 34 determines whether the point of gaze of the subject is present in the route areas A01 to A19 and the target areas B01 to B09. The determination unit 34 outputs determination data at the determination intervals that are the same as the above-described sampling intervals.

Figure 7:
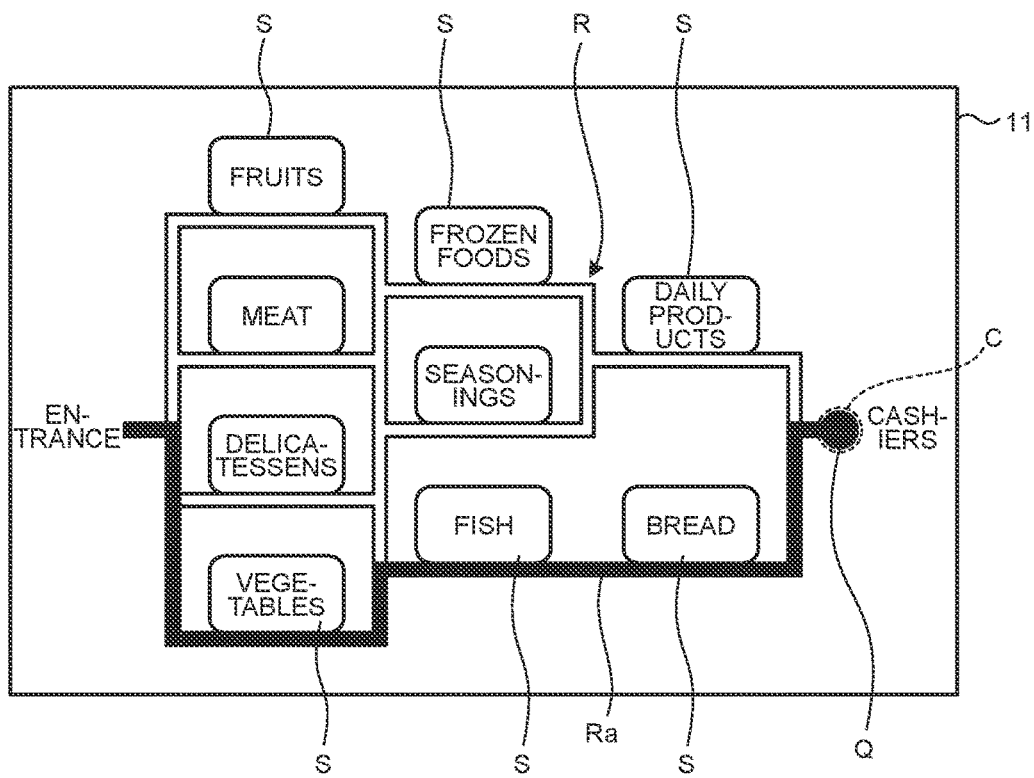
FIG. 7 is a diagram illustrating an example of right answer information that is displayed on the display unit in the first embodiment.

FIG. 7 is a diagram illustrating an example of the right answer information that is displayed on the display unit 11. As illustrated in FIG. 7, the display controller 31 displays, on the display unit 11, how a moving subject Q moves from the entrance (start point) to the exit (end point) along a matching route Ra in the right answer period TC. The area setting unit 33 sets an area of moving C in an area corresponding to the moving subject Q. The area setting unit 33 causes the area of moving C to move along the move of the moving subject Q.

The point-of-gaze detector 32 detects positional data on the point of gaze of the subject at the specific sampling intervals (for example, every 20 milliseconds) in the period during which the right answer information is displayed. Based on the positional data on the point of gaze, the determination unit 34 determines whether the point of gaze of the subject is present in the area of moving C. The determination unit 34 outputs determination data at the determination intervals that are the same as the sampling intervals described above.

Based on the determination data, the arithmetic processing unit 35 calculates point-of-gaze data representing the progress of shift of the point of gaze of the subject in each of the question period TA, the answer period TB, and the right answer period TC. When calculating point-of-gaze data in the question period TA, the arithmetic processing unit 35 calculates a time in which the point of gaze is present in the route areas A01 to A19 and the target areas B01 to B09, that is, presence time data. The arithmetic processing unit 35 increments the count value of a target counter each time the point of gaze is detected in the target areas B01 to B09. The arithmetic processing unit 35 calculates a count value CNT1 of the target counter as the presence time data on the target areas B01 to B09. The arithmetic processing unit 35 increments the count value of a route counter each time the point of gaze is detected in the route areas A01 to A19. The arithmetic processing unit 35 calculates a count value CNT2 of the route counter as the presence time data on the route areas A01 to A19.

When calculating point-of-gaze data in the answer period TB, the arithmetic processing unit 35 calculates number-of-shifts data, goal reaching data, last area data, and shift order data as the point of gaze data based on the determination data of the determination unit 34.

When calculating each set of point-of-gaze data, in the case where the determination unit 34 determines that the point of gaze is in the route areas A01 to A19, the arithmetic processing unit 35 calculates a route area in which the point of gaze is present as a relevant area. The arithmetic processing unit 35 counts a period in which the point of gaze is present successively in a single route area with a succession counter and calculates a count value GPCNT. When the count value GPCNT reaches 10, that is, when the relevant area is the same route area for ten times successively, the arithmetic processing unit 35 considers that the subject was gazing the single route area and calculates the route area as a point-of-gaze area. Note that, when the point-of-gaze area is calculated, the arithmetic processing unit 35 stores the calculated point-of-gaze area as a transit history in the storage unit 38. In the storage unit 38, route areas that are calculated as point-of-gaze areas are stored as the transit history in the order of the calculation.

In the case where one point-of-gaze area is calculated and then a route area adjacent to the point-of-gaze area is calculated as a relevant area, the arithmetic processing unit 35 determines that the point of gaze of the subject shifts from the route area to the adjacent route area. The arithmetic processing unit 35 counts the number of times the point of gaze shifts to an adjacent route area with a shift counter and calculates a count value MVCNT.

In the example illustrated in FIGS. 4 to 7, the matching route Ra can be described in association with the route areas A01 to A19 as follows: the route areas A01→A03→A04→A08 (target area B04) →A11→A14→A17→A18→A19.

In this case, the number of shifts serving as the right answer with respect to shifts in the route areas A01 to A19 is eight. Thus, the arithmetic processing unit 35 calculates a difference DIF between the count value MVCNT that is the actual number of shifts and eight that is the right answer as the number-of-shifts data.

The arithmetic processing unit 35 determines whether the point of gaze of the subject reaches the route area A08 corresponding to the target area B04 based on the transit history that is stored in the storage unit 38. When the point of gaze of the subject reaches the route area A08, the arithmetic processing unit 35, for example, sets the value GOAL of the target reaching data at 1 (or a constant) and, when the point of gaze of the subject does not reach the route area A08, the arithmetic processing unit 35, for example, sets the value GOAL of the target reaching data at 0.

The route area serving as the right answer of the end point of the matching route Ra is the route area A19. Thus, the arithmetic processing unit 35 determines whether the route area that the point of gaze of the subject reaches eventually is the route area A19 based on the transit history that is stored in the storage unit 38 and, based on the result of the determination, the arithmetic processing unit 35 calculates last area data. When the route area that the point of gaze of the subject reaches eventually is the route area A19, for example, the arithmetic processing unit 35 is able to set the value REGI of the last area data at 1 and, when the route area that the point of gaze of the subject reaches eventually is not the route area A19, for example, the arithmetic processing unit 35 is able to set the value REGI of the last area data at 0.

Based on the transit history that is stored in the storage unit 38, the arithmetic processing unit 35 also compares the order in which the point of gaze of the subject shifts through the route areas A01 to A19 actually and the above-described order in the matching route Ra and determines whether the orders agree with each other. When the actual order agrees with the order in the matching route Ra, the arithmetic processing unit 35 can set a value ODR of the shift order data at 1 and, when the actual order does not agree with the order in the matching route Ra, the arithmetic processing unit 35 can set the value ODR of the shift order data at 0. Not limited to the evaluation in which that the matching route Ra is the shortest route, for example, even for a route that is different from the shortest route, the value ODF of the shift order data may be set larger than 0 as long as the route meets the instruction information I1.

When calculating point-of-gaze data in the right answer period TC, the arithmetic processing unit 35 calculates a time in which the point of gaze is present in the area of moving C, that is, presence time data, based on the determination data obtained by the determination unit 34. The arithmetic processing unit 35 increments the count value of the shift counter by one each time the point of gaze is detected in the area of moving C. The arithmetic processing unit 35 calculates a count value CNT3 of the shift counter as presence time data with respect to the area of moving C.

The evaluation unit 36 calculates an evaluation value based on the presence time data, the number-of-shifts data, the target reaching data, the last area data, and the shift order data and calculates evaluation data based on the evaluation value. In the first embodiment, the evaluation unit 36 is able to calculate an evaluation value ANS1, for example, as follows:

$$ANS1 = K1 \cdot CNT1 + K2 \cdot CNT2 + K3 \cdot CNT3 + K4 \cdot DIF + K5 \cdot GOAL + K6 \cdot REGI + K7 \cdot ODR$$

where the constants K1 to K7 are constants for weighting. For example, the constants K1 to K3>0, K4<0, and K5 to K7>0 can be satisfied.

When the value of the presence time data in the question period TA and the right answer period TC is high and the value of the number-of-shifts data is low and each of the values of the target reaching data, the last area data, and the shift order data is high in the answer period TB, ANS1 is high. This represents that the subject is gazing the route R and the target subject S in the question period TA and is visually pursuing the moving subject Q in the right answer period TC. This further represents that the subject is shifting the point of gaze along the matching route Ra in the answer period TB. Thus, when the evaluation value ANS1 is high, it is possible to evaluate that the subject is less likely to be suffering from cognitive disorder and brain dysfunction.

On the other hand, when the value of the presence time data in the question period TA and the right answer period TC is low and the value of the number-of-shifts data is high and each of the values of the target reaching data, the last area data, and the shift order data is low in the answer period TB, ANS1 is low. This represents that the subject is not gazing the route R and the target subject S sufficiently in the question period TA and is not visually pursuing the moving subject Q sufficiently in the right answer period TC. This also represents that the subject is not shifting the point of gaze along the matching route Ra in the answer period TB. Thus, when the evaluation value ANS1 is low, it is possible to evaluate that the subject is likely to be suffering from cognitive disorder and brain dysfunction.

The evaluation unit 36 is able to store the value of the evaluation value ANS in the storage unit 38. For example, evaluation values ANS on the same subject may be cumulatively stored and an evaluation in comparison with an evaluation value in the past may be made. For example, when the evaluation value ANS is a value higher than the evaluation value in the past, it is possible to evaluate that the brain function has improved from the previous evaluation. In the case where the cumulative value of the evaluation values ANS is gradually increasing, or the like, it is possible to evaluate that the brain function is improving gradually.

In the first embodiment, the input-output controller 37 is able to, when the evaluation unit 36 outputs the evaluation data, cause the output device 40 to output, for example, character data presenting "it is considered that the subject is less likely to be suffering from cognitive disorder and brain dysfunction", character data presenting "it is considered that the subject is likely to be suffering from cognitive disorder and brain dysfunction", or the like, according to the evaluation data. The input-output controller 37 is also able to, when the evaluation value ANS on the same subject is higher than the evaluation value ANS in the past, cause the output device 40 to output character data presenting "the brain function has improved", or the like.

The larger the number of target subjects to be passed through in the above-described question is, the more the difficulty increases. For this reason, in the evaluation by the above-described evaluation unit 36, it is preferable to increase the value of the evaluation value ANS1 as the number of target subjects passed through increases. Thus, it is possible to make an evaluation corresponding to the number of matching subjects. The evaluation unit 36 is able to calculate the evaluation value ANS1a, for example, according to the number of matching subjects as follows:

$$ANS1a=j(K1 \cdot CNT1+K2 \cdot CNT2+K3 \cdot CNT3+K4 \cdot DIF+K5 \cdot GOAL+K6 \cdot REGI+K7 \cdot ODR)$$

where j is a constant larger than 1 and, the larger the number of matching subjects is, the larger the value of j is.

Figure 8:
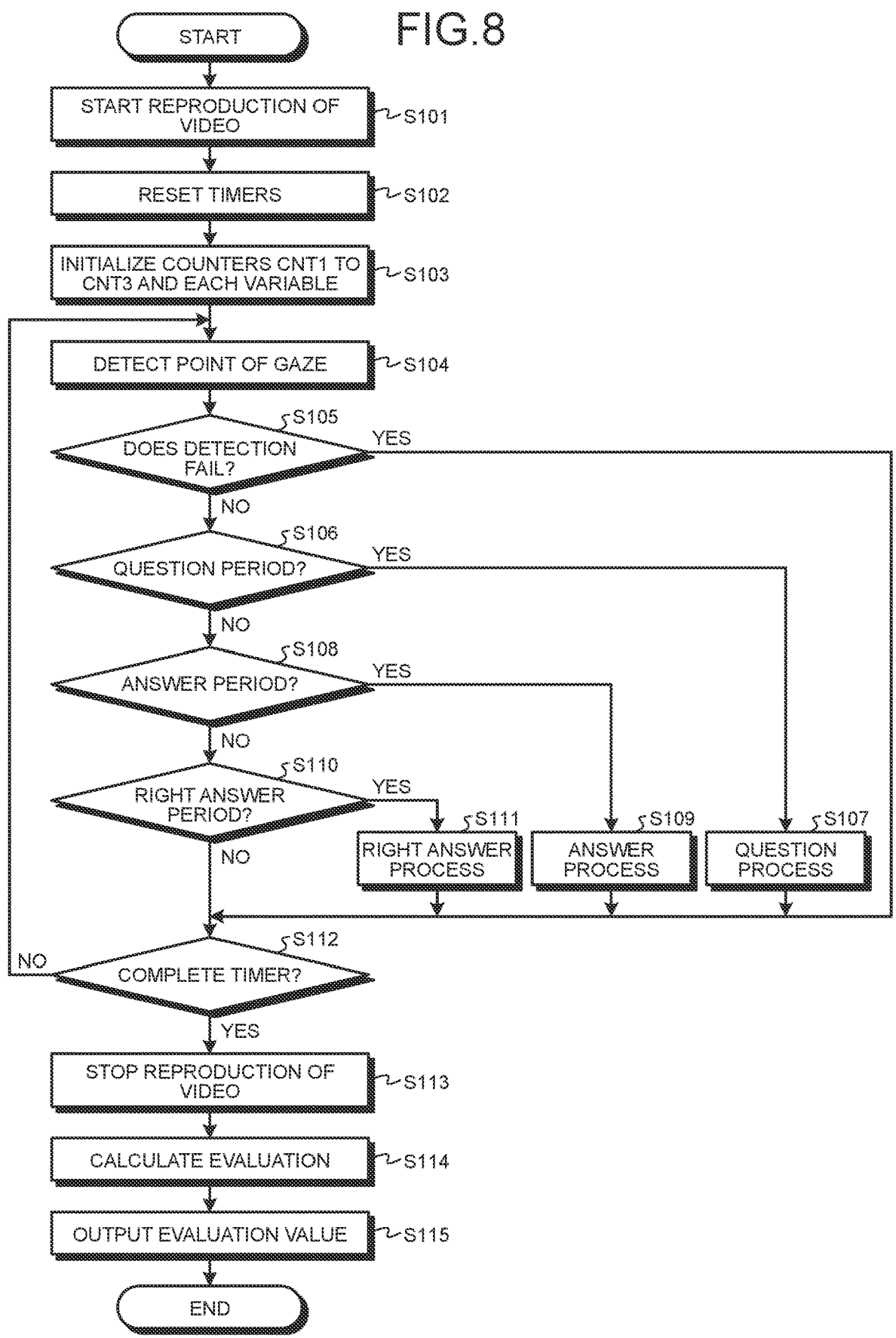
FIG. 8 is a flowchart illustrating an example of an evaluation method according to the first embodiment.

An example of the evaluation method according to the first embodiment will be described next with reference to FIGS. 8 to 11. FIG. 8 is a flowchart illustrating the example of the evaluation method according to the first embodiment. In the following example, the case where the evaluation video is reproduced is exemplified and described.

The display controller 31 starts reproduction of the evaluation video (step S101). The evaluation video illustrated in FIGS. 4, 5, 6 and 7 is displayed sequentially on the display unit 11 of the display device 10. The arithmetic processing unit 35 resets the timer that manages the time of reproduction of the evaluation video (step S102). More specifically, the arithmetic processing unit 35 resets the management timer that manages the time of reproduction of the evaluation video and a detection timer that detects which of time ranges T1 to T6 in the time chart illustrated in FIG. 3 the evaluation video currently reproduced belongs to and causes the timers to start counting.

The arithmetic processing unit 35 resets each of the sets of data of the above-described count values CNT1, CNT2, CNT3, GPCTN, MVCTN, DIF, GOAL, REGI and ODR to 0 and resets settings of the relevant area and the point-of-gaze area (step S103).

In the state of showing the evaluation video that is displayed on the display unit 11 of the display device 10 to the subject, the point-of-gaze detector 32 detects positional data on the point of gaze of the subject on the display unit 11 of the display device 10 at the specified sampling intervals (for example, every 20 milliseconds) (step S104).

The arithmetic processing unit 35 determines whether detection of the point of gaze fails in consideration of the case where the point of gaze is not detected due to blinking, or the like (step S105). When it is determined that detection of the point of gaze fails (YES at step S105), the arithmetic processing unit 35 goes to step S112. When it is determined that detection of the point of gaze does not fail (NO at step S105), the arithmetic processing unit 35 goes to step S106.

When it is determined that detection of the point of gaze does not fail (NO at step S105), the arithmetic processing unit 35 determines whether it is in the question period TA (step S106). More specifically, the arithmetic processing unit 35 determines whether it is in the time ranges T1 and T2 from the result of the detection by the detection timer. When it is determined that the detection result of the detection timer corresponds to the range of the time ranges T1 and T2 (YES at step S106), the arithmetic processing unit 35 performs a question process described below (step S107). After the question process is performed, the arithmetic processing unit 35 goes to step S112.

When it is determined that the detection result of the detection timer does not correspond to the range of the time ranges T1 and T2 (NO at step S106), the arithmetic processing unit 35 determines whether it is in the answer period TB (step S108). More specifically, the arithmetic processing unit 35 determines whether it is in the time ranges T3 and T4 from the detection result of the detection timer. When it is determined that the detection result of the detection timer corresponds to the range of the time ranges T3 and T4 (YES at step S108), the arithmetic processing unit 35 performs an answer process described below (step S109). After the answer process is performed, the arithmetic processing unit 35 goes to step S112.

When it is determined that the detection result of the detection timer does not correspond to the range of the time ranges T3 and T4 (NO at step S108), the arithmetic processing unit 35 determines whether it is in the right answer period TC (step S110). More specifically, the arithmetic processing unit 35 determines whether it is in the time ranges T5 and T6 from the detection result of the detection timer. When it is determined that the detection result of the detection timer corresponds to the range of the time ranges T5 and T6 (YES at step S110), the arithmetic processing unit 35 performs a right answer process described below (step S111). After the right answer process is performed, the arithmetic processing unit 35 goes to step S112.

When it is determined that the detection result of the detection timer does not correspond to the range of the time ranges T5 and T6 (NO at step S110) and the question process, the answer process, and the right answer process that are described above are performed, the arithmetic processing unit 35 determines whether the time at which reproduction of the evaluation video completes is reached based on the result of the detection by the management timer (step S112). When it is determined by the arithmetic processing unit 35 that the time at which reproduction of the evaluation video completes is not reached (NO at step S112), the processes at and after step S104 described above are performed repeatedly.

When it is determined by the arithmetic processing unit 35 that the time at which reproduction of the evaluation video completes is reached (YES at step S112), the display controller 31 stops reproduction of the evaluation video (step S113). The evaluation unit 36 calculates an evaluation value ANS1 based on the point-of-gaze data that is obtained from the above-described process result (step S114). The input-output controller 37 outputs the evaluation data that is calculated by the evaluation unit 36 (step S115). The process thus ends.

Figure 9:
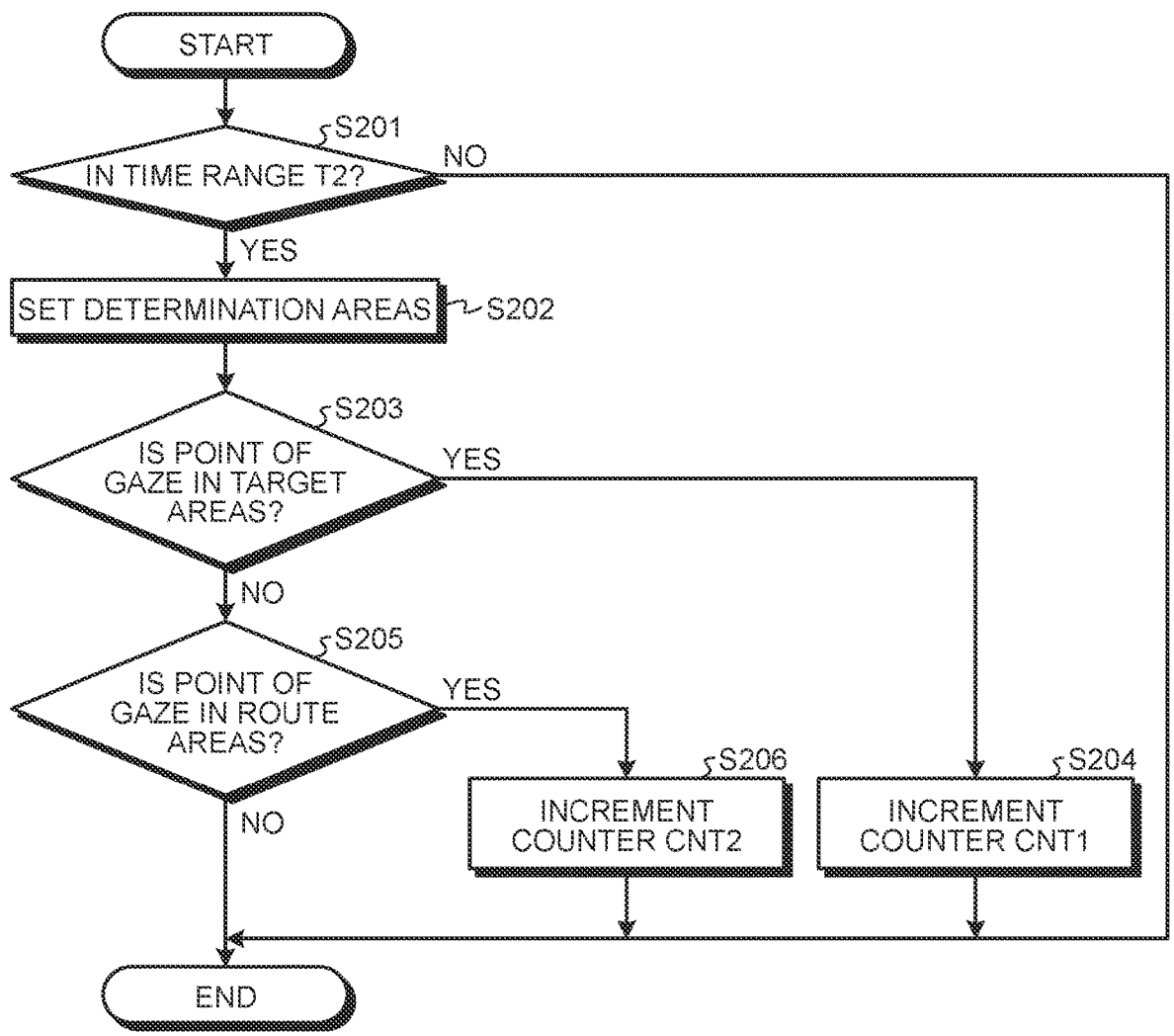
FIG. 9 is a flowchart illustrating an example of a question process according to the first embodiment.

FIG. 9 is a flowchart illustrating an example of the question process. As illustrated in FIG. 9, in the question process, the arithmetic processing unit 35 determines whether it is in the time range T2 according to the result of detection by the detection timer (step S201). When it is determined that the detection result of the detection timer is not the time range T2 (NO at step S201), the arithmetic processing unit 35 ends the process.

When it is determined that the detection result of the detection timer is the time range T2 (YES at step S201), the area setting unit 33 sets the route areas A01 to A19 and the target areas B01 to B09 as determination areas for checking whether the subject is gazing the area that should be gazed (step S202).

The determination unit 34 determines whether the point of gaze of the subject is present in the target areas B01 to B09 (step S203). When it is determined by the determination unit 34 that the point of gaze of the subject is present in the target areas B01 to B09 (YES at step S203), the arithmetic processing unit 35 increments the count value CNT1 (step S204).

When it is determined that the point of gaze of the subject is not present in the target areas B01 to B09 (NO at step S203), the determination unit 34 determines whether the point of gaze of the subject is present in the route areas A01 to A19 (step S205). When it is determined by the determination unit 34 that the point of gaze of the subject is present in the target areas B01 to B09 (YES at step S205), the arithmetic processing unit 35 increments the count value CNT2 (step S206).

When it is determined by the determination unit 34 that the point of gaze of the subject is not present in the route areas A01 to A19 (NO step S205) or when the processes at steps S204 and S206 are performed, the question process ends.

Figure 10:
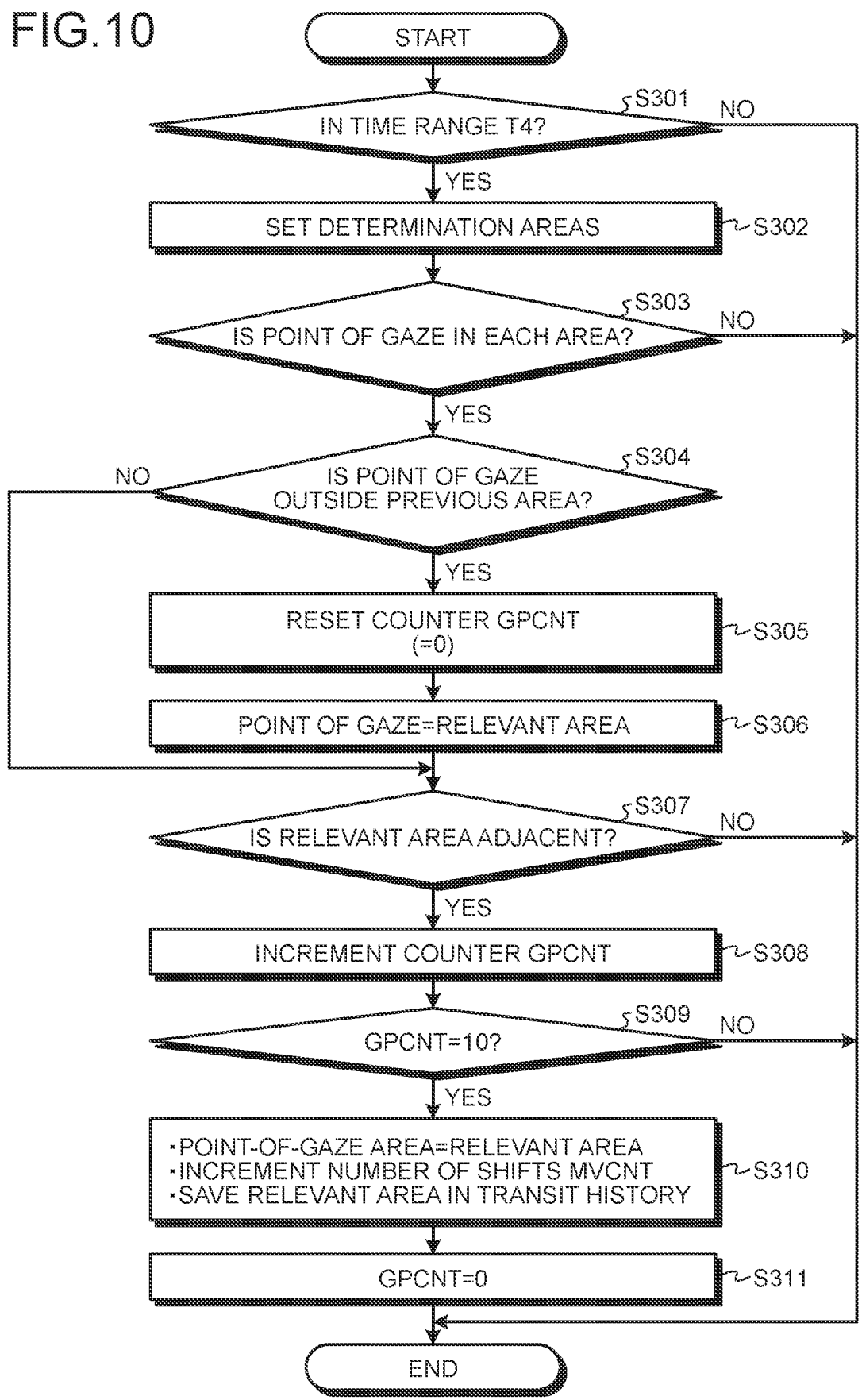
FIG. 10 is a flowchart illustrating an example of an answer process according to the first embodiment.

FIG. 10 is a flowchart illustrating an example of the answer process. As illustrated in FIG. 10, in the answer process, the arithmetic processing unit 35 determines whether it is in the time range T4 according to the result of detection by the detection timer (step S301). When it is determined that the detection result of the detection timer is not the time range T4 (NO at step S301), the arithmetic processing unit 35 ends the answer process.

When it is determined that the detection result of the detection timer is the time range T4 (YES at step S301), the area setting unit 33 sets the route areas A01 to A19 as determination areas for checking whether the subject is gazing the area that should be gazed (step S302).

The determination unit 34 determines whether the point of gaze of the subject is present in the route areas A01 to A19 (step S303). When it is not determined by the determination unit 34 that the point of gaze of the subject is present in the route areas A01 to A19 (NO at step S303), the answer process ends.

When it is determined by the determination unit 34 that the point of gaze of the subject is present in the route areas A01 to A19 (YES at step S303), the arithmetic processing unit 35 determines whether the point of gaze is present outside the route areas in the previous measurement (step S304). When it is determined that the point of gaze is present outside the route areas in the previous measurement (YES at step S304), the arithmetic processing unit 35 resets the count value GPCNT of the route counter (step S305) and sets the route area in which the point of gaze is detected as the relevant area (step S306).

When the determination unit 34 determines that the point of gaze of the subject is not present in the route areas A01 to A19 (NO at step S303) or when step S306 is performed, the arithmetic processing unit 35 determines whether the relevant area is adjacent to the latest point-of-gaze area (step S307). When it is determined that the relevant area is not adjacent to the latest point-of-gaze area (NO at step S307), the arithmetic processing unit 35 ends the answer process.

When it is determined that the relevant area is adjacent to the latest point-of-gaze area (YES at step S307), the arithmetic processing unit 35 increments the count value GPCNT of the route counter (step S308). The arithmetic processing unit 35 determines whether the count value GPCNT reaches 10 (step S309). When it is determined that the count value GPCNT does not reach 10 (NO at step S309), the arithmetic processing unit 35 ends the answer process.

When it is determined that the count value GPCNT reaches 10 (YES at step S309), the arithmetic processing unit 35 sets the relevant area as a new point-of-gaze area or updates the point-of-gaze area, increments the count value MVCNT of the shift counter, and stores the new point-of-gaze area (relevant area) as the transit history in the storage unit 38 (step S310). Thereafter, the arithmetic processing unit 35 resets the count value GPCNT of the route counter (step S311) and ends the answer process.

FIG. 11 is a flowchart illustrating an example of the right answer process. As illustrated in FIG. 11, in the right answer process, the arithmetic processing unit 35 determines whether it is in the time range T6 according to the result of detection by the detection timer (step S401). When it is determined that the detection result of the detection timer is not the time range T6 (NO at step S401), the arithmetic processing unit 35 ends the process.

When it is determined that the detection result of the detection timer is the time range T6 (YES at step S401), the area setting unit 33 sets the area of moving C as a determination area for checking whether the subject is gazing the area that should be gazed (step S402).

The determination unit 34 determines whether the point of gaze of the subject is present in the area of moving C (step S403). When it is determined by the determination unit 34 that the point of gaze of the subject is present in the area of moving C (YES at step S403), the arithmetic processing unit 35 increments the count value CNT3 (step S404).

When it is determined by the determination unit 34 that the point of gaze of the subject is not present in the area of moving C (NO at step S403) or when the process at step S404 is performed, the right answer process ends.

As described above, the evaluation device 100 according to the first embodiment includes the image acquisition device 20 that acquires image data on the eyeballs of a subject; the point-of-gaze detector 32 that detects positional data on the point of gaze of the subject based on the image data; the display controller 31 that, in the case where an instruction to shift the point of gaze along a matching route Ra that meets a given condition from routes R illustrated on a route map M is made to the subject, causes the display unit 11 to display the route map M containing the routes R; the area setting unit 33 that sets a route area corresponding to the matching route Ra on the display unit 11; the determination unit 34 that determines whether a point of view of the subject is present in the route area based on the positional data on the point of gaze; and the evaluation unit 36 that calculates evaluation data on the subject based on the result of the determination by the determination unit 34.

The evaluation method according to the first embodiment includes acquiring image data on the eyeballs of a subject; detecting positional data on the point of gaze of the subject based on the image data; in the case where an instruction to shift the point of gaze along a matching route Ra that meets a given condition from routes R illustrated on a route map M is made to the subject, causing the display unit 11 to display the route map M containing the routes R; setting a route area corresponding to the matching route Ra on the display unit 11; determining whether a point of view of the subject is present in the route area based on the positional data on the point of gaze; and calculating evaluation data on the subject based on the result of the determination.

The evaluation program according to the first embodiment causes a computer to execute a process of acquiring image data on the eyeballs of a subject; a process of detecting positional data on the point of gaze of the subject based on the image data; a process of, in the case where an instruction to shift the point of gaze along a matching route Ra that meets a given condition from routes R illustrated on a route map M is made to the subject, causing the display unit 11 to display the route map M containing the routes R; a process of setting a route area corresponding to the matching route Ra on the display unit 11; a process of determining whether a point of view of the subject is present in the route area based on the positional data on the point of gaze; and a process of calculating evaluation data on the subject based on the result of the determination.

According to the first embodiment, when the instruction to shift the point of gaze along the matching route Ra that meets the given condition from the routes R illustrated on the route map M is made to the subject, the evaluation data on the subject is calculated based on the point-of-gaze data. Thus, the evaluation device 100 is able to evaluate performance of the subject, such as cognitive performance and performance in shifting the point of gaze, according to the shift of the line of sight of the subject. Accordingly, the evaluation device 100 is able to make an evaluation on the subject accurately.

In the evaluation device 100 according to the first embodiment, when the instruction to shift the point of gaze along the matching route Ra passing through a specific subject Sa that is a specific target subject among target subjects S that are arranged along the routes S on the route map M is made to the subject, the display controller 31 displays the route map M containing the target subjects S, the area setting unit 33 sets target areas B01 to B09 corresponding to the target subjects S on the display unit 11, the determination unit 34 determines whether the point of view of the subject is present in the target areas B01 to B09 based on the positional data on the point of gaze. This enables the evaluation device 100 to make an evaluation on the subject more accurately.

In the evaluation device 100 according to the first embodiment, the matching route Ra contains the shortest route among the routes R. Thus, it is possible to make a proper evaluation when the subject shifts the point of gaze along the shortest route among the routes R. Accordingly, the evaluation device 100 is able to make an evaluation on the subject more accurately.

Second Embodiment

A second embodiment will be described next. An evaluation device according to the second embodiment has the same configuration as the configuration according to the first embodiment. Thus, the same components of the evaluation device according to the second embodiment as those of the evaluation device 100 according to the first embodiment are denoted with the same reference numerals and description thereof is omitted or simplified. The content of processing in the computer system 30 of the evaluation device 100 according to the second embodiment is different from that of the first embodiment. The aspects different from those of the first embodiment will be described mainly below.

As in the first embodiment, the computer system 30 includes the display controller 31, the point-of-gaze detector 32, the area setting unit 33, the determination unit 34, the arithmetic processing unit 35, the evaluation unit 36, the input-output controller 37, and the storage unit 38.

The display controller 31 causes the display unit to display a plurality of subjects representing different categories of things on the display unit. For example, when an instruction to gaze a matching subject that matches a given condition from the subjects representing different categories of things is made to a subject, the display controller 31 causes the display unit 11 to display the subjects according to the instruction.

The display controller 31 is able to cause the display unit 11 to display instruction information representing each instruction to the subject described above. In this case, for example, after causing the display unit 11 to display the instruction information for a given period, the display controller 31 is able to cause the display unit 11 to display a route map. The instruction information to the subject described above is not limited to the mode of being displayed on the display unit 11. For example, the instruction may be made to the subject previously, a mode in which the instruction is made to the subject by sound may be employed, or a mode in which the instruction is presented in a site different from the display unit 11 may be employed.

After causing the display unit 11 to display the route map, the display controller 31 is able to display right answer information representing a right answer to the instruction on the display unit 11. The display controller 31 is able to cause the display unit 11 to display, as right information, for example, the matching object that meets the given condition in a mode different from that of other subjects.

The point-of-gaze detector 32 detects positional data on the point of gaze of the subject. In the second embodiment, the point-of-gaze detector 32 detects a line-of-sight vector of the subject that is specified by the three-dimensional global coordinate system based on image data on the left and right eyeballs EB of the subject that is acquired by the image acquisition device 20. The point-of-gaze detector 32 detects positional data on an intersection between the detected line-of-sight vector of the subject and the display unit 11 of the display device 10 as positional data on the point of gaze of the subject. In other words, in the second embodiment, the positional data on the point of gaze is the positional data of the intersection between the line-of-sight vector of the subject that is specified by the three-dimensional global coordinate system and the display unit 11 of the display device 10. In the first embodiment, the point of gaze is a specified point on the display unit 11 that is specified by being gazed by the subject. The point-of-gaze detector 32 detects positional data on the point of gaze of the subject at specified sampling intervals. The sampling interval can be, for example, the period of a frame synchronization signal that is output from the imaging device 21 (for example, every 20 milliseconds).

The area setting unit 33 sets a determination area corresponding to the matching subject on the display unit 11. When a plurality of matching subjects are set, the area setting unit 33 sets determination areas for the matching subjects, respectively. In the second embodiment, the determination area that is set by the area setting unit 33 is not displayed on the display unit 11 in principle. Note that, for example, the determination area may be displayed on the display unit 11 under the control of the display controller 31.

During the period in which the determination area is set by the area setting unit 33, the determination unit 34 determines whether the point of gaze is present in each determination area based on the positional data on the point of gaze and outputs determination data. The determination unit 34 determines whether the point of gaze is present in the determination area at specified determination intervals. The determination interval can be, for example, the same period as the period of the frame synchronization signal that is output from the imaging device 21 (for example, every 20 milliseconds). In this case, the determination interval of the determination unit 34 is the same as the sampling interval of the point-of-gaze detector 32.

Based on the determination data obtained by the determination unit 34, the arithmetic processing unit 35 calculates point-of-gaze data representing the progress of shift of the point of gaze in the period in which the above-described determination area is set. The arithmetic processing unit 35 calculates, for example, presence time data as the point-of-gaze data.

The presence time data is data representing a time in which the point of gaze is present in the determination area. The arithmetic processing unit 35 includes a timer that detects an elapsed time from the time when an evaluation video is displayed on the display unit 11 and a counter that counts the number of times it is determined by the determination unit 34 that the point of gaze is present in the determination area. The arithmetic processing unit 35 may include a management timer that manages the time of reproduction of the evaluation video.

The evaluation unit 36 calculates evaluation data on the subject based on the point-of-gaze data. The evaluation data contains data on evaluation on whether the subject is being able to gaze a specific subject and a comparative subject that are displayed on the display unit 11.

The input-output controller 37 acquires data (image data on the eyeballs EB, input data, or the like) from at least one of the image acquisition device 20 and the input device 50. The input-output controller 37 outputs data to at least one of the display device 10 and the output device 40. The input-output controller 37 may output a task to the subject from the output device 40, such as an audio output device.

The storage unit 38 stores the determination data, the point-of-gaze data (the presence time data), and the evaluation data that are described above. The storage unit 38 further stores an evaluation program that causes a computer to execute a process of acquiring image data on the eyeballs of a subject; a process of detecting positional data on the point of gaze of the subject based on the image data; a process of, in the case where an instruction to gaze matching subjects U1 and U2 that meet the given condition from a plurality of subjects U representing different categories of things is made to the subject, causing the display unit 11 to display the subjects U; a process of setting determination areas D1 and D2 corresponding to the matching subjects U1 and U2 that meet the instruction presented to the subject among the subjects U; a process of determining whether a point of view of the subject is present in the determination areas D1 and D2 based on the positional data on the point of gaze; and a process of calculating evaluation data on the subject based on the result of the determination.

Evaluation Method

An evaluation method according to the second embodiment will be described next. The evaluation method according to the second embodiment makes an evaluation on cognitive disorder and brain dysfunction of a subject by using the evaluation device 100 described above. In the second embodiment, the subjects representing different categories of things are displayed on the display unit 11 using the evaluation video, an instruction to gaze the matching subjects that meet the given condition from the subjects is made to the subject, and it is determined whether the subject is being able to deal with the instruction.

The symptoms of cognitive disorder and brain dysfunction are known for affecting cognitive performance, the memory, and analytical performance of the subject. In the case where the subject is not suffering from cognitive disorder or brain dysfunction, when a plurality of subjects and an instruction are presented, the subject is able to accurately understand the task. The subject is also able to analyze a subject that meets the instruction accurately based on the information in the memory and gaze the matching subject.

On the other hand, in the case where the subject is suffering from cognitive disorder and brain dysfunction, even when a plurality of subjects and an instruction are presented, the subject sometimes is unable to accurately understand the task. The subject sometimes is also unable to analyze a subject that meets the instruction accurately based on the information in the memory. Thus, for example, taking the following procedure makes it possible to evaluate the subject.

FIG. 12 is a diagram illustrating categories of items that are sold in a store, such as a supermarket, as an example of the categories of things. Note that the categories of things are not limited to categories of items and the categories may be other categories. As illustrated in FIG. 12, the categories of items are classified into rough categories and medium categories. The rough categories are categories based on the types of items, such as fruits, meat, delicatessens, vegetables, frozen foods, seasonings, fish, daily products, bread and confections. The medium categories are categories based on specific examples of the respective types of the rough categories. Apple, orange, strawberry, etc., are exemplified as the medium categories of fruits. Pork, beef, etc., are exemplified as the medium categories of meat. Fried foods, simmered foods, etc., are exemplified as the medium categories of delicatessens. Japanese radish, carrot, cabbage, etc., are exemplified as the medium categories of vegetables. Frozen dumpling, etc., are exemplified as the medium categories of frozen foods. Salt, pepper, sugar, etc., are exemplified as the medium categories of seasonings. Sliced raw fish, dried Japanese horse mackerel, etc., are exemplified as the medium categories of fish. Yogurt, milk, etc., are exemplified as the medium categories of daily products. Sandwich, white bread, etc., are exemplified as the medium categories of bread. Chocolate, candy, gum, etc., are exemplified as the medium categories of confections. Examples of the rough category and the medium category are not limited to the above-listed categories. A plurality of stages of categories that are at least three stages of categories may be set, for example, using small categories that further specifies the medium categories.

Figure 13:
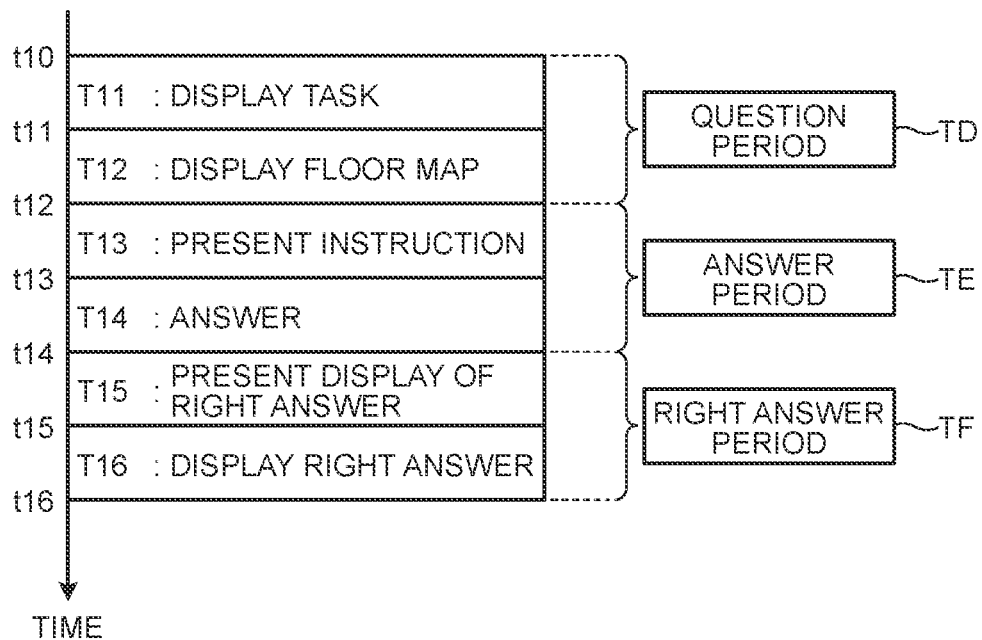
FIG. 13 is a diagram illustrating an example of a timetable of an evaluation video that is displayed on a display unit according to a second embodiment.

FIG. 13 is a diagram illustrating an example of a timetable of the evaluation video that is displayed on the display unit 11. As illustrated in FIG. 13, the evaluation video has a question period TD, an answer period TE, and a right answer period TF. The question period TD includes a period T11 (from a time t10 to a time t11) during which the task to the subject is displayed on the display unit 11 and a period T12 (from a time t11 to a time t12) during which the subjects related to the task are displayed on the display unit 11. Note that, at and after the period T12, the subjects are displayed until the answer period TE ends. The answer period TE includes a period T13 (from a time t12 to a time t13) during which the instruction to the subject is output by sound and a period T14 (from a time t13 to a time t14) during which the subject is made provide an answer. During the answer period TB, the subjects are being displayed on the display unit 11. The right answer period TF includes a period T15 (from a time t14 to a time t15) during which an output notifying that a right answer is to be displayed is made by sound to the subject and a period T6 (from a time t15 to a time t16) during which the right answer is displayed on the display unit 11.

Figure 14:
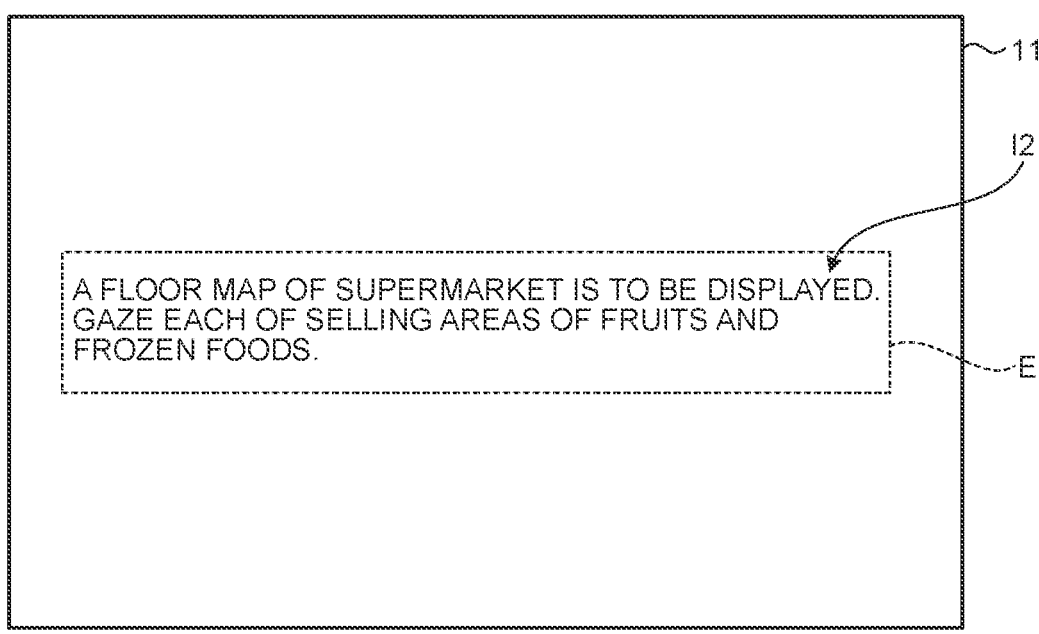
FIG. 14 is a diagram illustrating an example of an instruction that is displayed on the display unit in the second embodiment.

FIG. 14 is a diagram illustrating an example of the task that is displayed on the display unit 11. As illustrated in FIG. 14, the display controller 31 displays, for example, instruction information I2 to the subject on the display unit 11 for a given period in the question period TD. In the second embodiment, the instruction information I2 makes an instruction to gaze selling areas of fruits and frozen foods on a floor map of a store, such as a supermarket. Note that, in the second embodiment, the case where the instruction information I2 is displayed on the display unit 11 is exemplified; however, the instruction information I2 is not limited thereto. For example, the input-output controller 37 may make, in addition to a display of the instruction information I2 or instead of the display of the instruction information I2, an output of sound corresponding to the instruction information I2 from a speaker. When displaying the instruction information I2, the area setting unit 33 is able to set a determination area E corresponding to the instruction information I2. The area setting unit 33, for example, is able to set the determination area E in an area in a shape that overlaps the area in which the instruction information I2 is displayed.

Figure 15:
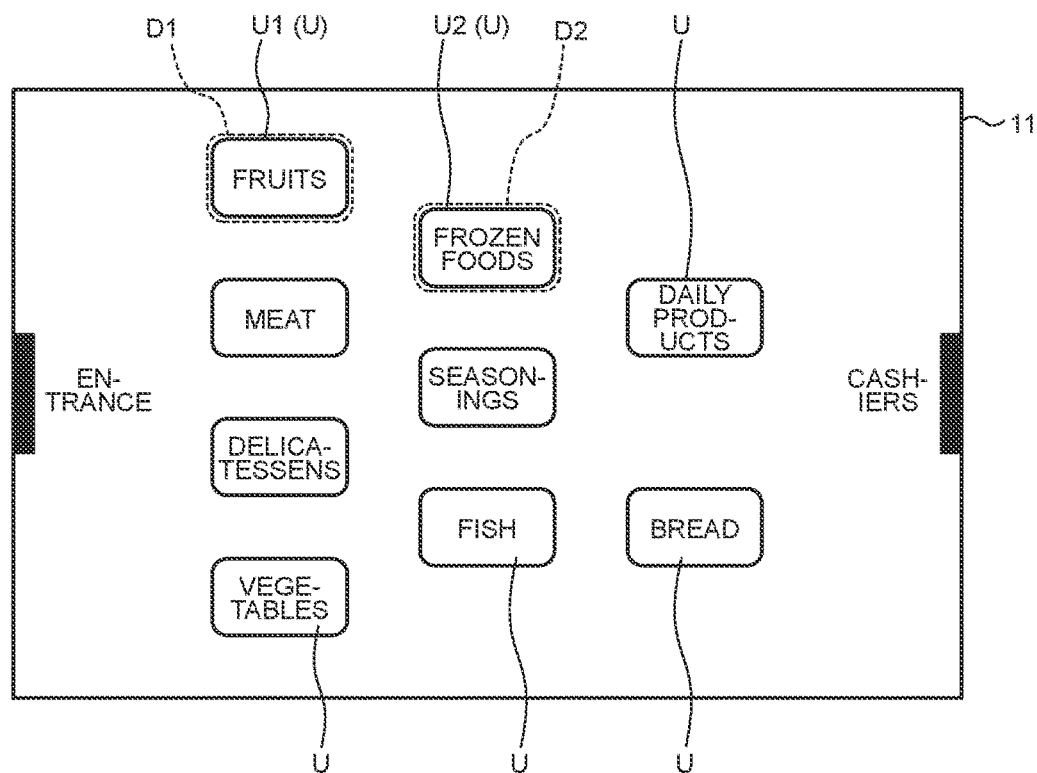
FIG. 15 is a diagram illustrating an example of a floor map that is displayed on the display unit in the second embodiment.

FIG. 15 is a diagram illustrating an example of the floor map that is displayed on the display unit 11. As illustrated in FIG. 15, the display controller 31 displays a floor map N of the store on the display unit 11. The route map N contains the subjects U. Content representing rough categories among categories of items is illustrated as the subjects U. In the example illustrated in FIG. 15, matching subjects that meet the instruction information I2 are a matching subject U1 representing fruits and a matching subject U2 representing frozen foods.

The area setting unit 33 is able to set the determination areas D1 and D2 corresponding to the matching subjects U1 and U2. The area setting unit 33, for example, is able to set the determination areas D1 and D2 in areas in shapes that overlap the areas in which the matching subjects U1 and U2 are presented. In the second embodiment the area setting unit 33 makes a setting on the display unit 11 such that the determination areas D1 and D2 do not overlap each another.

In the period during which the floor map N is displayed, that is, in each of the period T12 of the question period TD and the period T13 and the period T14 of the answer period TE, the point-of-gaze detector 32 detects positional data on the point of gaze of the subject at the specific sampling intervals (for example, every 20 milliseconds). Based on the positional data on the point of gaze, the determination unit 34 determines whether the point of gaze of the subject is present in the determination areas D1 and D2. The determination unit 34 outputs determination data at the determination intervals that are the same as the above-described sampling intervals.

Figure 16:
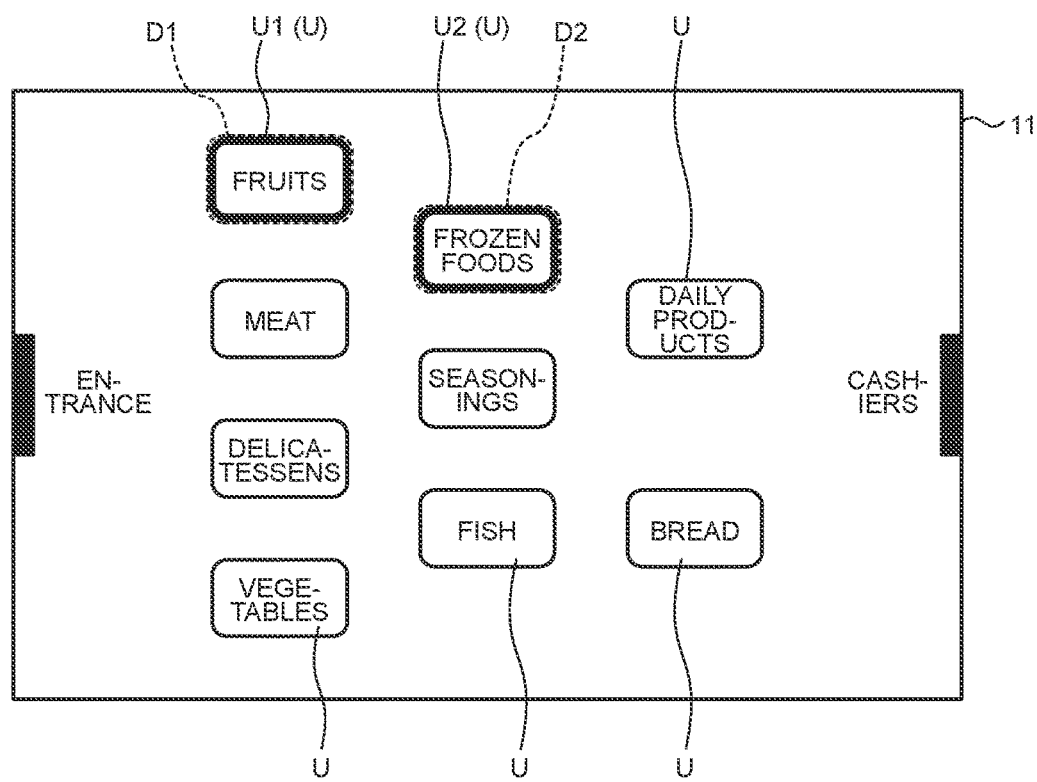
FIG. 16 is a diagram illustrating an example of right answer information that is displayed on the display unit in the second embodiment.

FIG. 16 is a diagram illustrating an example of the right answer information that is displayed on the display unit 11. As illustrated in FIG. 16, in the right answer period TF, the display controller 31 displays the matching subjects U1 and U2 in a mode different from that of other subjects U on the display unit 11. In the example illustrated in FIG. 16, the lines marking off the matching subjects U1 and U2 are displayed in a more bold state than that of the lines marking off other subjects U. Note that the example in which the matching subjects U1 and U2 are displayed in a mode different from that of other subjects U is not limited to this. In this case, the area setting unit 33 sets the determination areas D1 and D2 corresponding to the matching subjects U1 and U2 as in the answer period TE.

In the period in which the right answer information is displayed, the point-of-gaze detector 32 detects positional data on the point of gaze of the subject at the specific sampling intervals (for example, every 20 milliseconds). Based on the positional data on the point of gaze, the determination unit 34 determines whether the point of gaze of the subject is present in the determination areas D1 and D2. The determination unit 34 outputs determination data at the determination intervals that are the same as the above-described sampling intervals.

Based on the determination data, the arithmetic processing unit 35 calculates point-of-gaze data representing the progress of shift of the point of gaze of the subject in each of the question period TD, the answer period TD, and the right answer period TF. When calculating point-of-gaze data, the arithmetic processing unit 35 calculates a time in which the point of gaze is present in the determination area E and a time in which the point of gaze is present in the determination areas D1 and D2 as presence time data. In the question period TD, the arithmetic processing unit 35 increments the count value CNT4 of a question counter each time the point of gaze is detected in the determination area E. In the answer period TE, the arithmetic processing unit 35 increments the count value CNT5 of an answer counter each time the point of gaze is detected in the determination areas D1 and D2. In the right answer period TF, the arithmetic processing unit 35 increments the count value CNT6 of a right answer counter each time the point of gaze is detected in the determination areas D1 and D2. The arithmetic processing unit 35 calculates the count value CNT4 of the question counter, the count value CNT5 of the answer counter, and the count value CNT6 of the right answer counter as the presence time data.

The evaluation unit 36 calculates an evaluation value based on the presence time data in each period and calculates evaluation data based on the evaluation value. In the first embodiment, the evaluation unit 36 is able to calculate an evaluation value ANS2, for example, as follows:

$$ANS2 = K8 \ge CNT4 + K9 \ge CNT5 + K10 \ge CNT6$$

where the constants K8 to K10 are constants for weighting. For example, the constants K8 to K10>0.

In the question period TD, the answer period TE, and the right answer period TF, when the value of the presence time data (the count values CNT4, CNT5 and CNT6) is high, ANS2 is high. This represents that the subject is gazing the instruction information I2 in the question period TD and gazing the matching subjects U1 and U2 in the answer period TE and the right answer period TF. Thus, when the evaluation value ANS2 is high, it is possible to evaluate that the subject is less likely to be suffering from cognitive disorder and brain dysfunction.

On the other hand, in the question period TD, the answer period TE, and the right answer period TF, when the value of the presence time data (the count values CNT4, CNT5 and CNT6) is low, ANS2 is low. This represents that the subject is not gazing the instruction information I2 sufficiently in the question period TD and is not gazing the matching subjects U sufficiently in the answer period TE and the right answer period TF. Thus, when the evaluation value ANS2 is low, it is possible to evaluate that the subject is likely to be suffering from cognitive disorder and brain dysfunction.

The larger the number of matching subjects is in the above-described question, the more the difficulty increases. For this reason, in the evaluation by the above-described evaluation unit 36, it is preferable to increase the value of the evaluation value ANS2 as the number of matching subjects increases. Thus, it is possible to make an evaluation corresponding to the number of matching subjects. The evaluation unit 36 is able to calculate the evaluation value ANS2$a$, for example, according to the number of matching subjects as follows:

$$ANS2a = h \cdot (K8 \cdot CNT4 + K9 \cdot CNT5 + K10 \cdot CNT6)$$

where h is a constant larger than 1 and, the larger the number of matching subjects is, the larger h is.

Figure 17:
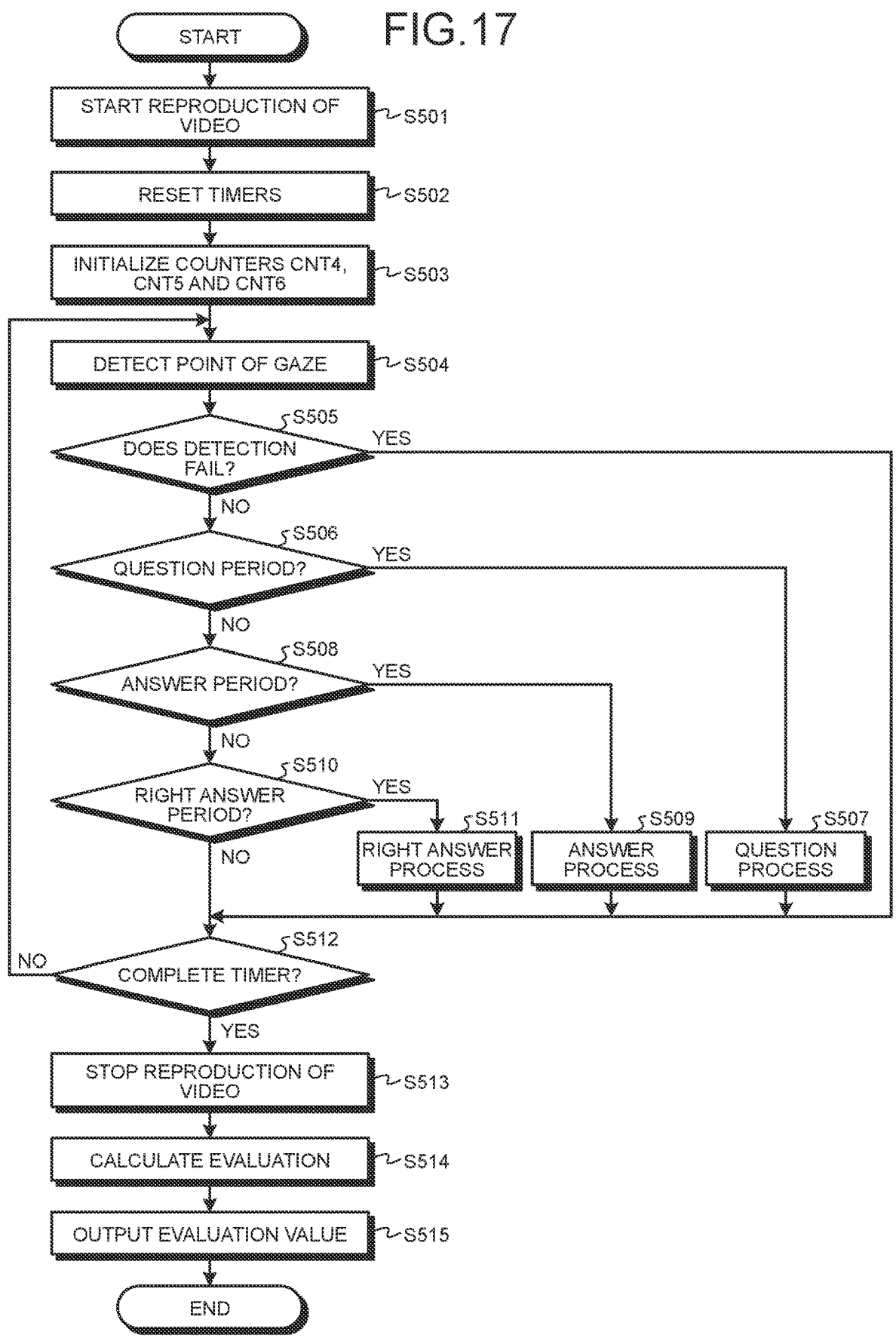
FIG. 17 is a flowchart illustrating an example of an evaluation method according to the second embodiment.

An example of the evaluation method according to the second embodiment will be described with reference to FIGS. 17 and 18. FIG. 17 is a flowchart illustrating the example of the evaluation method according to the second embodiment. In the following example, the case where the evaluation video is reproduces will be exemplified.

The display controller 31 starts reproduction of the evaluation video (step S501). The evaluation video illustrated in FIGS. 14, 15, and 16 is displayed sequentially on the display unit 11 of the display device 10. The arithmetic processing unit 35 resets the timer that manages the time of reproduction of the evaluation video (step S502). The arithmetic processing unit 35 resets each of the count values CNT4, CNT5 and CNT6 to 0 (step S503).

The point-of-gaze detector 32 detects positional data on the point of gaze of the subject on the display unit 11 of the display device 10 (step S504). The arithmetic processing unit 35 determines whether detection of the point of gaze fails (step S505). When it is determined that detection of the point of gaze fails (YES at step S105), the arithmetic processing unit 35 goes to step S512. When it is determined that detection of the point of gaze does not fail (NO at step S505), the arithmetic processing unit 35 goes to step S506.

When it is determined that detection of the point of gaze does not fail (NO at step S505), the arithmetic processing unit 35 determines whether it is in the question period TD (step S506). When it is determined that it is in the question period TD (YES at step S506), the arithmetic processing unit 35 performs the question process described below (step S507). After the question process is performed, the arithmetic processing unit 35 goes to step S512.

When it is determined that it is not in the question period TD (NO at step S506), the arithmetic processing unit 35 determines whether it is in the answer period TE (step S508). When it is determined that it is in the answer period TE (YES at step S508), the arithmetic processing unit 35 performs the answer process described below (step S509). After the answer process is performed, the arithmetic processing unit 35 goes to step S512.

When it is determined that it is not in the answer period TE (NO at step S508), the arithmetic processing unit 35 determines whether it is in the right answer period TF (step S510). When it is determined that it is in the right answer period TF (YES at step S510), the arithmetic processing unit 35 performs the answer process described below (step S511). After the right answer process is performed, the arithmetic processing unit 35 goes to step S512.

When it is determined that it is not in the right answer period TF (NO at step S510) and the question process, the answer process, and the right answer process that are described above are performed, the arithmetic processing unit 35 determines whether the time at which reproduction of the evaluation video completes is reached based on the result of the detection by the management timer (step S512). When it is determined by the arithmetic processing unit 35 that the time at which reproduction of the evaluation video completes is not reached (NO at step S512), the processes at and after step S504 described above are performed repeatedly.

When it is determined by the arithmetic processing unit 35 that the time at which reproduction of the evaluation video completes is reached (YES at step S512), the display controller 31 stops reproduction of the evaluation video (step S513). The evaluation unit 36 calculates an evaluation value ANS2 (or ANS2$a$) based on the point-of-gaze data that is obtained from the above-described process result (step S514). The input-output controller 37 outputs the evaluation data that is calculated by the evaluation unit 36 (step S115). The process thus ends.

Figure 18:
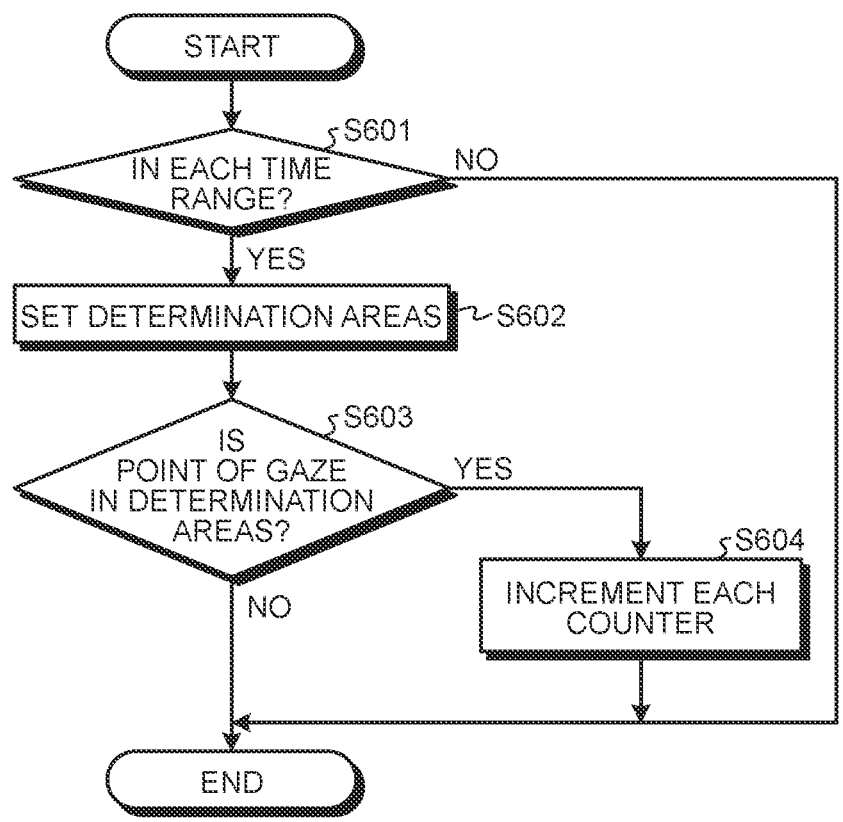
FIG. 18 is a flowchart illustrating an example of a question process, an answer process and a right answer process in the second embodiment.

FIG. 18 is a flowchart illustrating an example of the question process, the answer process and the right answer process. As illustrated in FIG. 18, the question process, the answer process, and the right answer process are performed according to similar flows. The arithmetic processing unit 35 determines whether it is in each of the time ranges of the question process, the answer process, and the right answer process according to the detection result of the detection timer (step S601). When it is determined that the detection result of the detection timer is not the corresponding time range (NO at step S601), the arithmetic processing unit 35 ends the process.

When it is determined that the detection result of the detection timer is the corresponding time range (YES at step S601), the area setting unit 33 sets the determination areas D1, D2 and E as determination areas for checking whether the subject is gazing the area that should be gazed (step S602).

The determination unit 34 determines whether the point of gaze of the subject is present in the determination areas D1, D2 and E (step S603). When it is determined by the determination unit 34 that the point of gaze of the subject is present in the determination areas D1 and D2 (YES at step S603), the arithmetic processing unit 35 increments the corresponding count values CNT4, CNT5 and CNT6 (step S604).

When it is determined that the point-of-gaze of the subject is not present in the determination areas D1, D2 and E (NO at step S603) or when the process at step S604 is performed, the determination unit ends each of the question process, the answer process, and the right answer process.

As described above, the evaluation device 100 according to the second embodiment includes the image acquisition device 20 that acquires image data on the eyeballs of a subject; the point-of-gaze detector 32 that detects positional data on the point of gaze of the subject based on the image data; the display controller 31 that, in the case where an instruction to gaze matching subjects U1 and U2 that meet the given condition from a plurality of subjects U representing different categories of things is made to the subject, causing the display unit 11 to display the subjects U; the area setting unit 33 that sets determination areas D1 and D2 corresponding to the matching subjects U1 and U2 that meet the instruction presented to the subject among the subjects U on the display unit 11; the determination unit 34 that determines whether a point of view of the subject is present in the determination areas D1 and D2 based on the positional data on the point of gaze; and the evaluation unit 36 that calculates evaluation data on the subject based on the result of the determination by the determination unit 34.

The evaluation method according to the second embodiment includes acquiring image data on the eyeballs of a subject; detecting positional data on the point of gaze of the subject based on the image data; in the case where an instruction to gaze matching subjects U1 and U2 that meet the given condition from a plurality of subjects U representing different categories of things is made to the subject, causing the display unit 11 to display the subjects U; setting determination areas D1 and D2 corresponding to the matching subjects U1 and U2 that meet the instruction presented to the subject among the subjects U on the display unit 11; determining whether a point of view of the subject is present in the determination areas D1 and D2 based on the positional data on the point of gaze; and calculating evaluation data on the subject based on the result of the determination.

An evaluation program according to the second embodiment causes a computer to execute a process of acquiring image data on the eyeballs of a subject; a process of detecting positional data on the point of gaze of the subject based on the image data; a process of, in the case where an instruction to gaze matching subjects U1 and U2 that meet the given condition from a plurality of subjects U representing different categories of things is made to the subject, causing the display unit 11 to display the subjects U; a process of setting determination areas D1 and D2 corresponding to the matching subjects U1 and U2 that meet the instruction presented to the subject among the subjects U on the display unit 11; a process of determining whether a point of view of the subject is present in the determination areas D1 and D2 based on the positional data on the point of gaze; and a process of calculating evaluation data on the subject based on the result of the determination.

According to the second embodiment, when the instruction to gaze the matching subjects U1 and U2 that meet the given condition from the subjects U that are presented on the floor map N is made to the subject, evaluation data on the subject is calculated based on the point-of-gaze data. Thus, the evaluation device 100 is able to evaluate the cognitive performance, memory, and judgement of the subject according to the shift of the line of sight of the subject. This enables the evaluation device 100 to make an evaluation on the subject accurately.

In the evaluation device 100 according to the second embodiment, when there the matching subjects U1 and U2, the area setting unit 33 sets the determination areas D1 and D2 with respect to the respective matching subjects U1 and U2, respectively, and the determination unit 34 determines whether the point of view of the subject is present in each of the determination areas D1 and D2 based on the positional data on the point of gaze. This enables the evaluation device 100 to make an evaluation on the subject accurately.

In the evaluation device 100 according to the second embodiment, the evaluation unit 36 calculates evaluation data on the subject according to the number of matching subjects U1 and U2. The more the number of the matching subjects U1 and U2 increases, the more the determination is complicated, which increases difficulty in making an instruction. Thus, calculating evaluation data on the subject according to the number of the matching subjects U1 and U2 enables an accurate evaluation according to difficulty.

The technical scope of the disclosure is not limited to the above-described embodiments and changes can be added as appropriate within the scope of the disclosure. In the first and second embodiments, target subjects corresponding to the rough categories that are "vegetables", "fruits" and "frozen foods" are presented in the instructions of the instruction information I1 and I2 and the example in which the target subjects S and the subjects U all representing rough categories are presented on the route map M and the floor map N has been described; however, the instructions are not limited to this.

For example, target subjects and subjects that belong to medium categories, such as "cabbage", "apple" and "frozen dumpling", may be incorporated in the instruction content I1 and I2. Specifically, the instruction content I1 may be an instruction to consider the shortest route from the entrance to buy "cabbage". The instruction content I2 may be content of an instruction to gaze selling areas of "apple" and frozen foods on the floor map of a store, such as a supermarket.

In this case, it is necessary to determine which rough categories presented on the route map M and the floor map N "cabbage" and "apple" that are medium categories contained in the instruction content belong to. For this reason, incorporating the target subjects and the subjects of medium categories in the instruction content of the instruction information I1 and I2 increases difficulty in answering.

In this case, the evaluation unit 36 in the first embodiment is able to calculate an evaluation value ANS1$b$ as follows:

$$ANS1b = K1 \cdot CNT1 \cdot P + K2 \cdot CNT2 + K3 \cdot CNT3 + K4 \cdot DIF + K5 \cdot GOAL \cdot P + K6 \cdot REGI + K7 \cdot ODR$$

The evaluation unit 36 in the second embodiment is able to calculate an evaluation value ANS2$a$ as follows:

$$ANS2b = K8 \cdot CNT4 + K9 \cdot CNT5 \cdot P + K10 \cdot CNT6 \cdot P$$

When words of medium categories are contained in the instruction content in ANS1$b$ and ANS2$b$, it is possible to set the value of P larger than that in the case of an instruction not containing words of medium categories. For example, when there are two subjects using words of rough categories and there are three subjects using words of medium categories, P can be set as follows;

$$p = (a2 + b3)/5$$

where a<b.

Furthermore, the evaluation unit 36 of the first embodiment is able to calculate an evaluation value ANS1$c$ below that is a combination of the number of matching subjects and an instruction containing medium categories:

$$ANS1c = j(K1 \cdot CNT1 \cdot P + K2 \cdot CNT2 + K3 \cdot CNT3 + K4 \cdot DIF + K5 \cdot GOAL \cdot P + K6 \cdot REG1 \cdot K7 \cdot ODR)$$

Similarly, the evaluation unit 36 of the second embodiment is able to calculate an evaluation value ANS2$c$ below that is a combination of the number of matching subjects and an instruction containing medium categories:

$$ANS2c = h \cdot (K8 \cdot CNT4 + K9 \cdot CNT5 \cdot P + K10 \cdot CNT6P).$$

The portions "CNT1·P", "GOAL·P", "CNT5·P" and "CNT6·P" of the equation above may be calculated using an individual coefficient with respect to each determination area that is set on a matching subject. For example, determining that the medium categories "pork" and "beef" belong to a rough category "meat" is easier than determining medium categories "yogurt" and "cheese" belong to a rough category "daily products". In this case, when a common character (such as "meat") is contained in words presenting a medium category and a rough category, determining the rough category and the medium category is easy. As described above, for example, when the difficulty differs between determining rough categories and medium categories with respect to each matching subject, accurate evaluation according to difficulty is enabled.

According to the disclosure, it is possible to make an evaluation on cognitive disorder and brain dysfunction accurately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An evaluation device comprising:
an image data acquisition unit that acquires image data on eyeballs of a subject;
a point-of-gaze detector that detects positional data on a point of gaze of the subject based on the image data;
a display controller that causes a display unit to display a plurality of routes that connect a start point and an end point and a plurality of target subjects that are arranged along the routes;
an area setting unit that sets a route area corresponding to each of the routes and a target area corresponding to each of the target subjects on the display unit;
a determination unit that determines whether a point of view of the subject is present in the route area and the target area based on the positional data on the point of gaze; and
an evaluation unit that calculates evaluation data on the subject based on a result of determination by the determination unit, wherein
the evaluation unit calculates the evaluation data having a higher value as a value of the presence time data in a question period is high, and the higher value when an order of shifts of the point of gaze of the subject in an answer period is a right answer comparing to when not a right answer, using at least a presence time data on the point of gaze of the subject in the route area and the target area in the question period during which a task to the subject and a route map are displayed by the display controller and a data on whether the order of shifts of the point of gaze of the subject in the area of moving is the right answer in the answer period after an instruction to shift the point of gaze along a matching route that passes through a specific subject that is a specific target subject among the target subjects that are arranged along the routes on the route map is made to the subject.

2. The evaluation device according to claim 1, wherein the evaluation data calculated by the evaluation unit is higher data as number of the target subjects displayed by the display controller is high.

3. The evaluation device according to claim 1, wherein the specific subject included in the instruction made to the subject is one that directly represents the target subject or one that is included in a category represented by the target subject without directly representing the target subject, and
the evaluation data calculated by the evaluation unit is higher data when the specific subject included in the instruction made to the subject is one that is included in the category represented by the target subject without directly representing the target subject comparing to when the specific subject included in the instruction made to the subject is one that directly represents the target subject.

4. The evaluation device according to claim 1, wherein the display controller displays a moving route that becomes a right answer for the instruction made to the subject after the answer period,
the area setting unit sets an area of moving corresponding to the moving route, and
the evaluation unit calculates, by further using a presence time of the point of gaze of the subject in the area of moving, the evaluation data having a higher value as a value of a present time data on the point of gaze of the subject in the area of moving is high.

5. An evaluation method comprising:
acquiring image data on eyeballs of a subject;
detecting positional data on a point of gaze of the subject based on the image data;
causing a display unit to display a plurality of routes that connect a start point and an end point and a plurality of target subjects that are arranged along the routes;
setting a route area corresponding to each of routes and a target area corresponding to each of the target subjects on the display unit;
determining whether a point of view of the subject is present in the route area and the target area based on the positional data on the point of gaze; and
calculating evaluation data on the subject based on a result of the determining, wherein
when the evaluation data on the subject is calculated, the evaluation value has a higher value as a value of the presence time data in a question period is high, and the higher value when an order of shifts of the point of gaze of the subject in an answer period is a right answer comparing to when not a right answer, using at least a presence time data on the point of gaze of the subject in the route area and the target area in the question period during which a task to the subject and a route map are displayed by the display controller and a data on whether the order of shifts of the point of gaze of the subject in the area of moving is the right answer in the answer period after an instruction to shift the point of gaze along a matching route that passes through a specific subject that is a specific target subject among the target subjects that are arranged along the routes on the route map is made to the subject.

6. A non-transitory computer readable recording medium storing therein an evaluation program that causes a computer to execute a process comprising:
acquiring image data on eyeballs of a subject;
detecting positional data on a point of gaze of the subject based on the image data;
causing a display unit to display a plurality of routes that connect a start point and an end point and a plurality of target subjects that are arranged along the routes;
setting a route area corresponding to each of routes and a target area corresponding to each of the target subjects on the display unit;
determining whether a point of view of the subject is present in the route area and the target area based on the positional data on the point of gaze; and
calculating evaluation data on the subject based on a result of the determining, wherein
when the evaluation data on the subject is calculated, the evaluation value has a higher value as a value of the presence time data in a question period is high, and the higher value when an order of shifts of the point of gaze of the subject in an answer period is a right answer comparing to when not a right answer, using at least a presence time data on the point of gaze of the subject in the route area and the target area in the question period during which a task to the subject and a route map are displayed by the display controller and a data on whether the order of shifts of the point of gaze of the subject in the area of moving is the right answer in the answer period after an instruction to shift the point of gaze along a matching route that passes through a specific subject that is a specific target subject among the target subjects that are arranged along the routes on the route map is made to the subject.

* * * * *